(12) United States Patent
Ritter et al.

(10) Patent No.: US 11,717,786 B2
(45) Date of Patent: Aug. 8, 2023

(54) EXTREMELY LARGE PRESSURE SWING ADSORPTION PROCESSES FOR FLUE GAS TREATMENT

(71) Applicant: University of South Carolina, Columbia, SC (US)

(72) Inventors: James A. Ritter, Gilbert, SC (US); Armin D. Ebner, Lexington, SC (US); Charles E. Holland, Cayce, SC (US)

(73) Assignee: University of South Carolina, Columbia, SC (US)

( * ) Notice: Subject to any disclaimer, the term of this patent is extended or adjusted under 35 U.S.C. 154(b) by 181 days.

(21) Appl. No.: 17/194,759

(22) Filed: Mar. 8, 2021

(65) Prior Publication Data
US 2021/0346837 A1    Nov. 11, 2021

Related U.S. Application Data

(60) Provisional application No. 63/021,904, filed on May 8, 2020.

(51) Int. Cl.
*B01D 53/047* (2006.01)
*B01D 53/04* (2006.01)

(52) U.S. Cl.
CPC ..... *B01D 53/0476* (2013.01); *B01D 53/0407* (2013.01); *B01D 53/047* (2013.01); *B01D 2253/108* (2013.01); *B01D 2253/304* (2013.01); *B01D 2257/504* (2013.01); *B01D 2259/402* (2013.01); *B01D 2259/40013* (2013.01);
(Continued)

(58) Field of Classification Search
CPC .............. B01D 53/047; B01D 53/0407; B01D 53/0476; B01D 2253/108; B01D 2253/304; B01D 2257/504; B01D 2258/0283; B01D 2259/40013; B01D 2259/40028; B01D 2259/40035; B01D 2259/40037; B01D 2259/40041; B01D 2259/40043; B01D 2259/40052; B01D 2259/40067; B01D 2259/40075; B01D 2259/402; B01D 2259/403; B01D 2259/4062; B01D 2259/4063; B01D 2259/40066; B01D 2259/4068; Y02C 20/40
USPC .................. 96/108, 121; 95/96–98, 103, 139
See application file for complete search history.

(56) References Cited

U.S. PATENT DOCUMENTS

| | | |
|---|---|---|
| 3,564,816 A | 2/1971 | Batta |
| 3,986,849 A | 10/1976 | Fuderer et al. |
| 4,475,929 A | 10/1984 | Fuderer |

(Continued)

OTHER PUBLICATIONS

Ritter, James A., et al., Extremely Large Pressure Swing Adsorption Processes for Flue Gas Treatment, Dept. of Chemical Engineering, University of South Carolina, Columbia, SC, date not provided.

(Continued)

*Primary Examiner* — Frank M Lawrence, Jr.
(74) *Attorney, Agent, or Firm* — Burr & Forman LLP; Douglas L. Lineberry

(57) ABSTRACT

The current disclosure provides systems and methods for multiple beds undergoing a feed step at the same time with the same feed flow rate and multiple beds undergoing a light reflux step at the same time with the same light reflux flow rate to process a gas stream in a multi-bed, multi-unit vacuum swing adsorption (VSA) process using reasonably sized beds.

11 Claims, 31 Drawing Sheets

(52) U.S. Cl.
CPC ........... *B01D 2259/40028* (2013.01); *B01D 2259/40041* (2013.01)

(56) References Cited

U.S. PATENT DOCUMENTS

| | | | | |
|---|---|---|---|---|
| 5,203,888 | A * | 4/1993 | Maurer | B01D 53/047 95/122 |
| 6,210,466 | B1 | 4/2001 | Whysall et al. | |
| 2003/0015091 | A1* | 1/2003 | Xu | B01D 53/047 95/96 |
| 2005/0098034 | A1* | 5/2005 | Gittleman | C01B 3/56 96/121 |
| 2013/0255492 | A1* | 10/2013 | Hsu | C01B 3/56 95/100 |
| 2014/0373713 | A1* | 12/2014 | Weist, Jr. | B01D 53/047 95/100 |
| 2020/0054987 | A1* | 2/2020 | Bhadra | B01D 53/06 |
| 2020/0054988 | A1* | 2/2020 | Wagner | B01D 53/0446 |

OTHER PUBLICATIONS

Elseviers, Wim, et al., 50 Years of PSA Technology for H2 Purification, www.uop.com. UOP, LLC, Dec. 2015.

* cited by examiner

| VSA Process Feed Conditions and Adsorbent Properties | |
|---:|:---|
| Temperature, °C | 70 |
| Pressure, kPa (max) | 115 |
| Flow Rate, SLPM | 25,156,286 |
| Composition, vol% | |
| $CO_2$ | 15.69 |
| $N_2$ | 80.51 |
| $O_2$ | 2.83 |
| Ar | 0.97 |
| $H_2O$ | 0.0000 |
| | |
| Adsorbent | 13X |
| Diameter, mm | 3, 5, 9 |
| Pellet Density, kg/m$^3$ | 1,100 |
| Pellet Porosity | 0.540 |
| Bed Porosity | 0.416 |
| Heat Capacity, kJ/K/kg | 1.100 |

FIG. 1

| Targeted VSA Process Conditions and Performance | |
|---|---|
| $CO_2$ Recovery in Heavy Product, % | > 90 |
| $CO_2$ Purity in Heavy Product, vol % | > 95 |
| $O_2$ Concentration in Heavy Product, ppm | < 10 |
| Bed Pressure Drop in Feed Step, kPa | < 15 |
| Bed Pressure Drop in Light Reflux Step, kPa | < 2 |
| Regeneration Pressure, kPa (min) | 5 |
| $v/v_{Fl}$ in Cocurrent Steps | < 0.8 |
| $v/v_{Fl}$ in Countercurrent Steps | < 1.8 |

FIG. 2

| Unit Block of Duration $t_{ub} = t_1 + t_2 + t_3$ of the VSA Process Cycle Schedule I Utilizing $n_F + n_{LR} + 3$ Beds and 8 Steps | | | |
|---|---|---|---|
| Beds 1 to $n_F$ | F | | |
| Bed $n_F+1$ | HR | | |
| Bed $n_F+2$ | EqD | CnD1 | CnD2 |
| Beds $n_F+3$ to $n_F+n_{LR}+2$ | LR | | |
| Bed $n_F+n_{LR}+3$ | EqU | LPP | |
| Time | $t_1$ | $t_2$ | $t_3$ |

FIG. 3

Effect of $R_{LD}$ on the Number of Units and Number of Beds for the Feed and Light Reflux Steps per Unit with $D_p = 3$ mm and $LRR = 0.03$

| $R_{LD}$ | $n_{LR}$ | $n_F$ | $n_u$ | $D$ (m) | $L$ (m) | $\Delta P/P_o$ Feed | $\Delta P/P_o$ LR | $S \times 10^4$ (m²) |
|---|---|---|---|---|---|---|---|---|
|     | 3 | 3 | 8  | 7.16 | 5.73 | 0.1071 | 0.0190 | 2.089 |
| 0.8 | 4 | 3 | 6  | 7.88 | 6.31 | 0.1384 | 0.0171 | 2.109 |
|     | 5 | 4 | 4  | 9.03 | 7.22 | 0.1229 | 0.0179 | 2.211 |
|     | 6 | 5 | 3  | 9.93 | 7.95 | 0.1099 | 0.0180 | 2.344 |
|     | 3 | 3 | 12 | 5.81 | 5.81 | 0.1111 | 0.0195 | 2.290 |
| 1.0 | 4 | 3 | 9  | 6.39 | 6.39 | 0.1436 | 0.0176 | 2.312 |
|     | 5 | 4 | 6  | 7.32 | 7.32 | 0.1274 | 0.0184 | 2.424 |
|     | 6 | 5 | 4  | 8.38 | 8.38 | 0.1263 | 0.0200 | 2.470 |
|     | 3 | 3 | 17 | 4.87 | 5.84 | 0.1127 | 0.0197 | 2.506 |
| 1.2 | 4 | 3 | 13 | 5.32 | 6.39 | 0.1432 | 0.0175 | 2.546 |
|     | 5 | 4 | 8  | 6.26 | 7.51 | 0.1364 | 0.0193 | 2.599 |
|     | 6 | 5 | 6  | 6.89 | 8.27 | 0.1219 | 0.0195 | 2.754 |

FIG. 5

Effect of $D_P$ on the Number of Units and Number of Beds for the Feed and Light Reflux Step per Unit with $R_{LD} = 1.0$ and $LRR = 0.03$

| $D_P$ mm | $n_{LR}$ | $n_F$ | $n_u$ | $L=D$ m | $\Delta P/P_0$ Feed | $\Delta P/P_0$ LR | $S \times 10^4$ m2 |
|---|---|---|---|---|---|---|---|
| 3 | 3 | 3 | 12 | 5.81 | 0.1111 | 0.0195 | 2.290 |
|   | 4 | 3 | 9 | 6.39 | 0.1436 | 0.0176 | 2.312 |
|   | 5 | 4 | 6 | 7.32 | 0.1274 | 0.0184 | 2.424 |
|   | 6 | 5 | 4 | 8.38 | 0.1263 | 0.0200 | 2.470 |
| 9* | 1 | 2 | 5 | 7.78 | 0.1436 | 0.0184 | 1.140 |
|   | 2 | 4 | 2 | 10.56 | 0.0931 | 0.0148 | 1.260 |
|   | 3 | 5 | 1 | 13.30 | 0.1191 | 0.0149 | 1.223 |

*$D_p$ = 9.0 mm is not commercially available but easy to make commercially

FIG. 6

Effect of LRR on the Number of Units and Number of Beds for the Feed and Light Reflux Steps per Unit with $R_{LO} = 1.0$ and $D_p = 3$ mm

| LRR | $n_{LR}$ | $n_F$ | $n_w$ | $L = D$ m | $\Delta P/P_o$ Feed | $\Delta P/P_o$ LR | $S \times 10^4$ $m^2$ |
|---|---|---|---|---|---|---|---|
| 0.03 | 2 | 2 | 22 | 4.75 | 0.1279 | 0.0198 | 2.180 |
| | 3 | 3 | 12 | 5.81 | 0.1111 | 0.0195 | 2.290 |
| | 4 | 3 | 9 | 6.39 | 0.1436 | 0.0176 | 2.312 |
| | 5 | 4 | 6 | 7.32 | 0.1274 | 0.0184 | 2.424 |
| | 6 | 5 | 4 | 8.38 | 0.1263 | 0.0200 | 2.470 |
| 0.04 | 2 | 2 | 34 | 4.11 | 0.0865 | 0.0199 | 2.521 |
| | 3 | 2 | 19 | 4.98 | 0.1460 | 0.0193 | 2.373 |
| | 4 | 3 | 12 | 5.81 | 0.1111 | 0.0195 | 2.545 |
| | 5 | 3 | 9 | 6.39 | 0.1436 | 0.0188 | 2.543 |
| | 6 | 4 | 7 | 6.95 | 0.1113 | 0.0184 | 2.764 |

FIG. 7

| 8-Unit 9-Bed 7-Step VSA Cycle Schedule with 3 F Beds and 3 LR Beds |||||
|---|---|---|---|---|
| Bed 1 | Feed 1 ||||
| Bed 2 | Feed 2 ||||
| Bed 3 | Feed 3 ||||
| Bed 4 | HR ||||
| Bed 5 | EqD || CnD ||
| Bed 6 | LR 1 ||||
| Bed 7 | LR 2 ||||
| Bed 8 | LR 3 ||||
| Bed 9 | EqU || LPP ||
| Time | $t_1$ | $t_2$ | $t_3$ ||

FIG. 8A

| 8-Unit 10-Bed 7-Step VSA Cycle Schedule with 3 F Beds and 4 LR Beds ||||
|---|---|---|---|
| Bed 1 | Feed 1 |||
| Bed 2 | Feed 2 |||
| Bed 3 | Feed 3 |||
| Bed 4 | HR |||
| Bed 5 | EqD | CnD ||
| Bed 6 | LR 1 |||
| Bed 7 | LR 2 |||
| Bed 8 | LR 3 |||
| Bed 9 | LR 4 |||
| Bed 10 | EqU | LPP ||
| Time | $t_1$ | $t_2$ | $t_3$ |

FIG. 8B

| 8-Unit 11-Bed 7-Step VSA Cycle Schedule with 3 F Beds and 5 LR Beds | | | |
|---|---|---|---|
| Bed 1 | Feed 1 | | |
| Bed 2 | Feed 2 | | |
| Bed 3 | Feed 3 | | |
| Bed 4 | HR | | |
| Bed 5 | EqD | CnD | |
| Bed 6 | LR 1 | | |
| Bed 7 | LR 2 | | |
| Bed 8 | LR 3 | | |
| Bed 9 | LR 4 | | |
| Bed 10 | LR 5 | | |
| Bed 11 | EqU | LPP | |
| Time | $t_1$ | $t_2$ | $t_3$ |

FIG. 8C

| 2-Unit 9-Bed 7-Step VSA Cycle Schedule with 3 F Beds and 3 LR Beds |||
|---|---|---|
| Bed 1 | Feed 1 ||
| Bed 2 | Feed 2 ||
| Bed 3 | Feed 3 ||
| Bed 4 | HR ||
| Bed 5 | EqD | CnD |
| Bed 6 | LR 1 ||
| Bed 7 | LR 2 ||
| Bed 8 | LR 3 ||
| Bed 9 | EqU | LPP |
| Time | $t_1$ | $t_2$ \| $t_3$ |

FIG. 8D

| 2-Unit 10-Bed 7-Step VSA Cycle Schedule with 3 F Beds and 4 LR Beds | | | |
|---|---|---|---|
| Bed 1 | Feed 1 | | |
| Bed 2 | Feed 2 | | |
| Bed 3 | Feed 3 | | |
| Bed 4 | HR | | |
| Bed 5 | EqD | CnD | |
| Bed 6 | LR 1 | | |
| Bed 7 | LR 2 | | |
| Bed 8 | LR 3 | | |
| Bed 9 | LR 4 | | |
| Bed 10 | EqU | LPP | |
| Time | $t_1$ | $t_2$ | $t_3$ |

FIG. 8E

| 1-Unit 3-Bed 7-Step VSA Cycle Schedule with 1 F Bed and 1 LR Bed | | | |
|---|---|---|---|
| Bed 1 | F | | |
| Bed 2 | HR | EqD | CnD |
| Bed 3 | LR | EqU | LPP |
| Time | $t_1 = 120$ s | $t_2 = 20$ s | $t_3 = 100$ s |

FIG. 8F

| VSA Process Parameters and Conditions Used in all DAPS Simulations Runs 1 – 39 FIG. 10 | | |
|---|---|---|
| $D_p$, mm | 3 | 9 |
| $t_1$, s | 20 | 20 |
| $t_2 = t_3$, s | 40, 50, 60, 70, 80, 100, 110 | 40, 50, 60, 70, 80, 100 |
| $t_{UB}(=t_1+t_2+t_3)$, s | 100, 120, 140, 160, 200, 220, 240 | 100, 120, 140, 160, 200, 220 |
| Feed Flow Rate, SLPM | 1,046,961.2 | 3,140,887.3 |
| LRR | 0.02, 0.03, 0.04 | 0.03 |
| $P_H$, kPa | 101.325 | |
| $P_L$, kPa | 5 | |

| VSA 6+$n_{LR}$-Bed 7 Step Cycle Schedule I ||||
|---|---|---|---|
| Bed 1 | Feed 1 |||
| Bed 2 | Feed 2 |||
| Bed 3 | Feed 3 |||
| Bed 4 | HR |||
| Bed 5 | EqD || CnD |
| Beds 6 to 5+$n_{LR}$ | LR1 to $n_{LR}$* |||
| Bed 6+$n_{LR}$ | EqU || LPP |
| Time | $t_1$ | $t_2$ | $t_3$ |

| VSA 6+$n_{LR}$-Bed 11-Step Cycle Schedule II | | | | |
|---|---|---|---|---|
| Bed 1 | Feed 1 | | | |
| Bed 2 | Feed 2 | | | |
| Bed 3 | Feed 3 | | | |
| Bed 4 | HR | | | |
| Bed 5 | EqD | PEqD | CnD | |
| Beds 6 to 5+$n_{LR}$ | LR 1 to $n_{LR}$* | | | |
| Beds 6+$n_{LR}$ | I | PEqU | I | |
| Bed 7+$n_{LR}$ | EqU | LPP | | |
| Time | $t_1$ | $t_2$ | $t_3$ | $t_4$ |

| VSA Process Parameters and Conditions Used with Schedule I in DAPS Runs 23 – 27 FIG. 10 ||
|---|---|
| Cycle Schedule | I |
| $D_p$, m | 0.003 |
| Unit | 8 |
| $t_1$, s | 20 |
| $t_2 = t_3$, s | 40, 50, 60, 70, 80, 100, 110 |
| $t_{CB}(= t_1 + t_2 + t_3)$, s | 100, 120, 140, 160, 200 |
| Feed Flow Rate per unit, SLPM | 1,046,961.2 |
| LRR | 0.03 |
| $P_H$, kPa | 101.325 |
| $P_L$, kPa | 5 |

FIG. 14A

| VSA Process Parameters and Conditions Used with Schedule II in DAPS Runs 40 – 67 FIG 15. ||
|---|---|
| Cycle Schedule | II |
| $D_p$, m | 0.003 |
| Unit | 8 |
| $t_1 = t_2$, s | 20 |
| $t_3 = t_4$, s | 30, 40, 50, 60, 70, 80, 100 |
| $t_{CB}(= t_1 + t_2 + t_3 + t_4)$, s | 100, 120, 140, 160, 180, 200, 240 |
| Feed Flow Rate per Unit, SLPM | 1,046,961.2 |
| LRR | 0.03, 0.04 |
| $P_H$, kPa | 101.325 |
| $P_L$, kPa | 5.0 |

| Run 66: VSA 13-Bed 11-Step Cycle Schedule II |||||
|---|---|---|---|---|
| Bed 1 | Feed 1 ||||
| Bed 2 | Feed 2 ||||
| Bed 3 | Feed 3 ||||
| Bed 4 | HR ||||
| Bed 5 | EqD | PEqD | CnD ||
| Bed 6 | LR 1 ||||
| Bed 7 | LR 2 ||||
| Bed 8 | LR 3 ||||
| Bed 9 | LR 4 ||||
| Bed 10 | LR 5 ||||
| Bed 11 | LR 6 ||||
| Bed 12 | I | PEqU | I ||
| Bed 13 | EqU | LPP |||
| Time | 20 s | 20 s | 70 s | 70 s |

FIG. 20

Run 66: Average Flow Rate and Average Concentration of Each Component Entering and Exiting a Bed Undergoing a Cycle Step as Indicated by a Stream Number in FIG. 21

| Cycle Step | $t_s$, s | Stream Number | $F_{s,avg}$ SLPM | $y_{CO2,avg}$ vol% | $y_{N2,avg}$ vol% | $y_{O2,avg}$ ppm | $y_{Ar,avg}$ ppm |
|---|---|---|---|---|---|---|---|
| F1 | 180 | 1 | 1046958.8 | 15.92 | 80.29 | 28300.0 | 9600.0 |
| | | 2 | 1714944.6 | 0.49 | 94.92 | 34259.2 | 11628.3 |
| F2 | 180 | 3 | 1046958.8 | 15.92 | 80.29 | 28300.0 | 9600.0 |
| | | 4 | 906018.3 | 1.17 | 94.41 | 32931.0 | 11172.5 |
| F3 | 180 | 5 | 1046958.8 | 15.92 | 80.29 | 28300.0 | 9600.0 |
| | | 6 | 915057.6 | 2.51 | 93.13 | 32560.9 | 11048.1 |
| HR | 180 | 7 | 643793.9 | 84.06 | 15.20 | 5502.0 | 1867.7 |
| | | 8 | 294913.8 | 3.00 | 92.87 | 30912.4 | 10394.5 |
| EqD1 | 20 | 9 | 667562.8 | 3.54 | 92.89 | 26734.3 | 8902.6 |
| PEqD2 | 20 | 10 | 179051.0 | 7.30 | 91.28 | 11164.1 | 3051.2 |
| CnD | 140 | 11 | 1023766.5 | 99.44 | 0.56 | 6.5 | 1.8 |
| LR1 | 180 | 12 | 258332.0 | 94.47 | 5.29 | 1822.3 | 619.0 |
| | | 13 | 30521.3 | 0.48 | 94.93 | 34280.5 | 11635.6 |
| LR2 | 180 | 14 | 129009.7 | 86.10 | 13.26 | 4822.3 | 1636.6 |
| | | 15 | 30208.8 | 0.48 | 94.93 | 34304.7 | 11643.9 |
| LR3 | 180 | 16 | 88068.5 | 80.09 | 18.98 | 6921.3 | 2349.2 |
| | | 17 | 30285.3 | 0.48 | 94.93 | 34302.4 | 11643.1 |
| LR4 | 180 | 18 | 69168.7 | 74.75 | 24.08 | 8778.4 | 2979.6 |
| | | 19 | 30336.2 | 0.48 | 94.93 | 34302.4 | 11643.2 |
| LR5 | 180 | 20 | 58543.2 | 70.16 | 28.46 | 10365.7 | 3518.3 |
| | | 21 | 30336.2 | 0.48 | 94.93 | 34302.4 | 11643.2 |
| LR6 | 180 | 22 | 51760.3 | 66.20 | 32.23 | 11727.6 | 3980.5 |
| | | 23 | 30354.0 | 0.48 | 94.93 | 34300.2 | 11642.4 |
| PEqU2 | 20 | 24 | 207803.9 | 7.20 | 91.32 | 11637.9 | 3205.4 |
| EqU1 | 20 | 25 | 707725.2 | 3.35 | 92.97 | 27596.7 | 9222.2 |
| LPP | 140 | 26 | 311770.9 | 0.43 | 94.50 | 38318.8 | 12378.9 |

FIG. 22

EXTREMELY LARGE PRESSURE SWING ADSORPTION PROCESSES FOR FLUE GAS TREATMENT

STATEMENT REGARDING FEDERALLY SPONSORED RESEARCH

This disclosure was made with government support under DE-FE0031730 awarded by the Department of Energy. The government may have certain rights in the disclosure.

TECHNICAL FIELD

The subject matter disclosed herein is generally directed to systems and methods for multiple beds undergoing a feed step at the same time with the same feed flow rate and multiple beds undergoing a light reflux step at the same time with the same light reflux flow rate to process a gas stream in a multi-bed, multi-unit vacuum swing adsorption (VSA) process using reasonably sized beds.

BACKGROUND

Extremely large gas flow rates, like that associated with flue gas produced from a 550 MW coal fired power plant, can exceed 25,000,000 SLPM. Even larger flue gas flow rates can be produced from steel mills. The flue gas produced from a 550 MW coal fired power plant consists primarily of 15 vol % $CO_2$, 65 vol % $N_2$, 8 vol % $O_2$, 12 vol % $H_2O$ and ppm levels of $SO_2$ and NOx at a pressure slightly above about 100 kPa and a temperature between ambient and 125° C. According to the Department of Energy (DOE), the goal is to capture and concentrate the $CO_2$ and produce it in a stream containing at least 95 vol % $CO_2$ with at least 90% $CO_2$ recovery and containing less than 10 ppm $O_2$. Pressure and vacuum swing adsorption processes are being touted for this application. However, an issue arises with these low pressure flue gas streams when fed to a pressure swing adsorption (PSA) process.

The issue is that the feed cannot be compressed very much because of the cost of compression. Hence, the feed must be compressed only slightly with a blower to about 120 kPa, thereby limiting the axial pressure drop along the bed to be less than about 20 kPa differential. This pressure drop limit/issue does not exist for PSA processes that operate with a feed pressure well above atmospheric pressure, like from 80 psia to 800 psia, the higher the better. Moreover, because the feed pressure is so low, to effectively regenerate the beds a vacuum must be applied, typically down to absolute pressures of around 5 kPa to 10 kPa. This is commonly referred to as a vacuum swing adsorption (VSA) process. To make matters even worse, the regeneration steps, typically consisting of countercurrent depressurization (CnD) and light reflux (LR) steps, also have a limit on the magnitude of the axial pressure drop, for if it is too large, then the beds are not effectively regenerated because the light end of the bed never experiences the lowest vacuum pressure experienced by the heavy or feed end of the bed. Again, this pressure drop limit/issue during the regeneration steps does not exist for PSA processes that operate with a low pressure of about atmospheric pressure during the light reflux step.

There are several patents that describe the use of multiple feed beds and multiple light reflux beds. But none of them do it to minimize axial pressure drop along the bed, while minimizing the total number of beds in one or more identical PSA units operating in parallel, because they are all associated mainly with high pressure $H_2$ purification. These kinds of PSA processes utilize feed step pressures that are well above atmospheric pressure and light reflux (purge) step pressures that are around atmospheric pressure. Hence, axial pressure drop along the bed is not an issue with $H_2$ PSA systems during feed or regeneration steps. The reason they use multiple feed and multiple light reflux beds is to improve performance. For example, Fuderer in U.S. Pat. No. 3,986,849 describes PSA systems with a minimum of seven beds, at least two feed beds and at least three equalization steps that improve light product recovery and are not restricted by the production rate of Batta in U.S. Pat. No. 3,564,816. The product recovery is improved via the three or more equalization steps while the production rate is improved by feeding two or more beds simultaneously. Fuderer in U.S. Pat. No. 3,986,849 does not teach how to use more feed beds, more light reflux beds and multiple PSA units operating in parallel to minimize axial pressure drop such that very large feed flow rates can be processed using a minimum number of total beds while still meeting the process performance requirements for $CO_2$ recovery from flue gas, for example. Whysall in U.S. Pat. No. 6,210,466 describes very large-scale PSA processes also for $H_2$ production. These PSA systems utilize 10 to 20 beds in a single PSA unit with multiple feed beds, multiple light reflux beds and multiple equalization steps. It is claimed that they can process about 2,000,000 SLPM of feed gas at elevated pressures in a single PSA unit. They claim this is possible due to the duration of the light reflux (purge) step being longer than the duration of the feed step with the ratio of their durations ranging from 1.25 to 1.50. Whysall in U.S. Pat. No. 6,210,466 does not teach how to use more feed beds, more light reflux beds and multiple PSA units operating in parallel to minimize axial pressure drop such that very large feed flow rates can be processed, more than ten times that claimed by Whysall in U.S. Pat. No. 6,210,466, using a minimum number of total beds while still meeting the process performance requirements for $CO_2$ recovery from flue gas, for example. In addition, Fuderer in U.S. Pat. No. 3,986,849 teaches that the feed step duration must be longer than the light reflux step duration, while Whysall in U.S. Pat. No. 6,210,466 teaches just the opposite, i.e., the feed step duration must be shorter than the light reflux step duration, while it is taught in this disclosure that the feed step duration must be equal, or substantially equal, to the light reflux step duration.

Over a period of about three decades, Stocker et al., 1998 [30 Years of PSA Technology for Hydrogen Purification] and Larsen et al. [Large Scale Hydrogen Plants: Uhde and UOP's Experience] (UOP merged with Union Carbide) showed that they could improve the $H_2$ productivity significantly relative to their initial 4-bed PSA $H_2$ systems [Batta, U.S. Pat. No. 3,564,816] by taking less adsorbent and dividing it among more, smaller beds. For example, in going from a 4-bed system to a 12-bed system over three decades, they utilized about 60% of the adsorbent inventory relative to the 4-bed system [Stocker et al.], with the $H_2$ productivity increasing by a factor of six [Larsen et al.]. Although the beds are relatively smaller and the $H_2$ productivity increases, more beds require more valves, piping, etc. The disclosure provided herein does just the opposite by teaching how to minimize the number of total beds by utilizing more feed beds, more light reflux beds and multiple PSA units operating in parallel to minimize axial pressure drop such that very large feed flow rates can be processed using a minimum number of total beds while still meeting the process performance requirements for $CO_2$ recovery from flue gas, for example.

The limits on the axial pressure drop during the feed and regeneration steps of a VSA cycle, which have been overlooked in the PSA flue gas literature, are dictated by the interstitial velocity in the bed which varies with time and position.

These axial pressure drop limits give rise to two constraints: 1) the longer the bed length the higher the axial pressure drop and 2) the higher the interstitial velocity the higher the axial pressure drop. These constraints place limits on both the height of the bed and the diameter of the bed, which, in turn, limits the amount of gas that can be processed in a bed during the feed step.

Accordingly, it is an object of the present disclosure to provide methods and systems utilizing increased numbers of feed beds, more light reflux beds and multiple PSA units operating in parallel to minimize axial pressure drop such that very large feed flow rates can be processed using a minimum number of total beds while still meeting the process performance requirements for $CO_2$ recovery from flue gas, for example. Although the $CO_2$ productivity decreases, the number of valves, piping, etc. is also minimized. Minimizing the number of beds by making them larger and minimizing the associated equipment are both important when processing more than 25,000,000 SLPM associated with a 550 MW coal fired power plant. Consider, there are numerous coal fired power plants that are double and triple this size in various places on the planet Earth. Because these are VSA systems, the only way to meet the process performance requirements is to minimize the axial pressure drop and this disclosure teaches how to do just that by also minimizing the number of total beds.

It is also an object of the present disclosure to remedy the above-described constraints. It was discovered that if multiple beds undergo the feed step at the same time with the same feed flow rate and if multiple beds undergo the light reflux step at the same time with the same light reflux flow rate, with the feed step and light reflux step durations being equal, or substantially equal, then the 25 million SLPM can be processed in a variety of reasonably sized VSA beds using one or more multi-bed VSA units with the beds having length to diameter aspect ratios of around 0.8 to 1.2. Many of these multi-bed VSA units meet the required process performance, including the $CO_2$ purity, $CO_2$ recovery and the limit on the $O_2$ concentration in the $CO_2$ heavy product.

Citation or identification of any document in this application is not an admission that such a document is available as prior art to the present disclosure.

SUMMARY

The above objectives are accomplished according to the present disclosure by providing in a first embodiment a system for reducing excessive pressure drop in a pressure swing adsorption process. The system may include a number of beds expressed as $n_F+n_{LR}+3$ wherein at least one bed is a feed bed, $n_F$, and at least one bed is a light reflux bed, $n_{LR}$, a unit block cycle duration $t_{UB}$ expressed as $t_{UB}=t_1+t_2+t_3$, at least two feed beds undergo a feed step (F) at a same time with a same feed flow rate and at least two light reflux beds undergo a light reflux (LR) step at a same time with a same light reflux flow rate, wherein the feed step and light reflux step durations are equal, or substantially equal, and the system undergoes at least one equalization step. The system may also include at least one cocurrent heavy reflux (HR) step receiving material from the light reflux step, at least one cocurrent equalization down (EqD) step, at least one countercurrent depressurization (CnD) step, at least one countercurrent LR step receiving a fraction of light product produced during the F step, at least one countercurrent equalization up (EqU) step that receives all gas leaving the EqD step, and at least one light product pressurization (LPP) step that receives light product produced during the F step. Further, a system sequence may be F-HR-EqD-CnD-LR-EqU-LPP. A system sequence may also be F1-F2-HR-EqD-CnD-LR1-LR2-LR3-EqU-LPP. Yet again, a system sequence may be F1-F2-F3-HR-EqD-CnD-LR1-LR2-LR3-EqU-LPP. Still again, a system sequence may be F1-F2-F3-HR-EqD-CnD-LR1-LR2-LR3-LR4-EqU-LPP. Moreover, a system sequence may be F1-F2-F3-HR-EqD-CnD-LR1-LR2-LR3-LR4-LR5-EqU-LPP. Further yet, pressure of the beds may be returned to approximately 1 atm at end of the LPP step. Again, the system may include at least one idle (I) step followed by at least one partial equalization up (PEqU) step and at least one partial equalization down (PEqD) step followed by at least one CnD step. Again still, a system sequence may be F1-F2-F3-HR-EqD-PEqD-CnD-LR1-LR2-LR3-LR4-LR5-I-PEqU-I-EqU-LPP. More yet, each bed may be identical in length L and diameter D as defined by a given aspect ratio $R_{LD}$ to provide $D=L/R_{LD}$. Furthermore, the system may provide a 10 ppm limit on $O_2$ concentration when $CO_2$ is a component of a heavy product. Again still, adsorbent beads ranging from 3 mm to 9 mm in diameter may be employed in beds of the system.

In an alternative embodiment, the disclosure provides a method for reducing excessive pressure drop in a pressure swing adsorption process. The method may include operating in parallel a number of beds expressed as $n_F+n_{LR}+3$ wherein at least one bed is a feed bed, $n_F$, and at least one bed is a light reflux bed, $n_{LR}$, arranging multiple feed beds to undergo a feed step (F) at a same time with a same feed flow rate, arranging multiple light reflux beds to undergo a light reflux (LR) step at a same time with a same light reflux flow rate, equalizing duration of the feed step and light reflux step, and undergoing at least one equalization step during the method. Further, the method may include arranging at least one cocurrent heavy reflux (HR) step to receive material from the light reflux step and providing at least one cocurrent equalization down (EqD) step, providing at least one countercurrent depressurization (CnD) step, providing at least one countercurrent LR step receiving a fraction of light product produced during the F step, providing at least one countercurrent equalization up (EqU) step that receives all gas leaving the EqD step, and providing at least one light product pressurization (LPP) step that receives light product produced during the F step. Again, the method may include creating a method sequence of F-HR-EqD-CnD-LR-EqU-LPP. The method may also include creating a method sequence of F1-F2-HR-EqD-CnD-LR1-LR2-LR3-EqU-LPP. Still, the method may include creating a method sequence of F1-F2-F3-HR-EqD-CnD-LR1-LR2-LR3-EqU-LPP. Moreover, the method may include creating a method sequence of F1-F2-F3-HR-EqD-CnD-LR1-LR2-LR3-LR4-EqU-LPP. Still yet, the method may include creating a method sequence of F1-F2-F3-HR-EqD-CnD-LR1-LR2-LR3-LR4-LR5-EqU-LPP. Further yet, the method may include returning pressure of the beds to substantially 1 atm at the LPP step. Still, the method may include providing at least one idle (I) step followed by at least one partial equalization up (PEqU) step and providing at least one partial equalization down (PEqD) step followed by at least one CnD step. Further again, the method may create a sequence of F1-F2-F3-HR-EqD-PEqD-CnD-LR1-LR2-LR3-LR4-LR5-I-PEqU-I-EqU-LPP. Still yet, the method may form each bed to be identical in length L and diameter D as defined by a given aspect ratio $R_{LD}$ to provide $D=L/R_{LD}$. Again still, the method may yield a 10 ppm limit on $O_2$ concentration when $CO_2$ is a component of a heavy product.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 1 shows VSA Process Feed Conditions and Adsorbent Properties.

FIG. 2 shows targeted VSA Process Conditions and Performance.

FIG. 3 shows Unit Block of Duration $t_{UB}=t_1+t_2+t_3$ of the VSA Process Cycle Schedule Utilizing $n_F+n_{LR}+3$ beds and 8 steps.

FIG. 5 shows the effect of $R_{LD}$ on the Number of Units and Number of Beds for the Feed and Light Reflux Steps per Unit with $D_p=3$ mm and LRR=0.03.

FIG. 6 shows the effect of $D_p$ on the Number of Units and Number of Beds for the Feed and Light Reflux Step per Unit with RLD=1.0 and LRR=0.03

FIG. 7 shows the effect of LRR on the number of units and number of beds for the feed and light reflux steps per unit with $R_{LD}=1.0$ and $D_p=3$ mm.

FIG. 8A shows a chart of an 8-Unit 9-Bed 7-Step VSA cycle schedule with 3 F beds and 3 LR beds.

FIG. 8B shows a chart of an 8-Unit 10-Bed 7-Step VSA cycle schedule with 3 F beds and 4 LR beds.

FIG. 8C shows a chart of an 8-Unit 11-Bed 7-Step VSA cycle schedule with 3 F beds and 5 LR beds.

FIG. 8D shows a chart of a 2-Unit 9-Bed 7-Step VSA cycle schedule with 3 F beds and 3 LR beds.

FIG. 8E shows a chart of a 2-Unit 10-Bed 7-Step VSA cycle schedule with 3 F beds and 4 LR beds.

FIG. 8F shows a chart of a 1-Unit 3-Bed 7-Step VSA cycle schedule with 1 F bed and 1 LR bed.

FIG. 9 shows VSA Process parameters and conditions used in all DAPS simulations for Runs 1-39 in FIG. 10.

FIG. 10 shows DAPS simulations of Cycle Schedule I: Summary of each run plotted in FIGS. 11 and 12.

FIG. 13A shows a VSA $6+n_{LR}$-Bed 7-Step Cycle Schedule I.

FIG. 13B shows a VSA $6+n_{LR}$-Bed 11-Step Cycle Schedule II.

FIG. 14A shows VSA process parameters and conditions used with Cycle Schedule I in DAPS Runs 23-27 in FIG. 10.

FIG. 14B shows VSA Process Parameters and Conditions Used with Cycle Schedule II in DAPS Runs 40-67 in FIG. 15.

FIG. 16A shows DAPS simulations using Cycle Schedule I: Summary of each run plotted in FIG. 17.

FIG. 16B shows DAPS simulations using Cycle Schedule II: Summary of each run plotted in FIGS. 17 to 19.

FIG. 20 shows a chart of a 8-Unit 13-Bed 11-Step VSA cycle schedule with 3 F beds and 6 LR beds corresponding to Run 66 in FIG. 16B.

FIG. 22 shows the average flow rate and average concentration of each component entering and exiting a bed undergoing a cycle step as indicated by a stream number in FIG. 21 for Run 66 in FIG. 16B.

Figure 4:
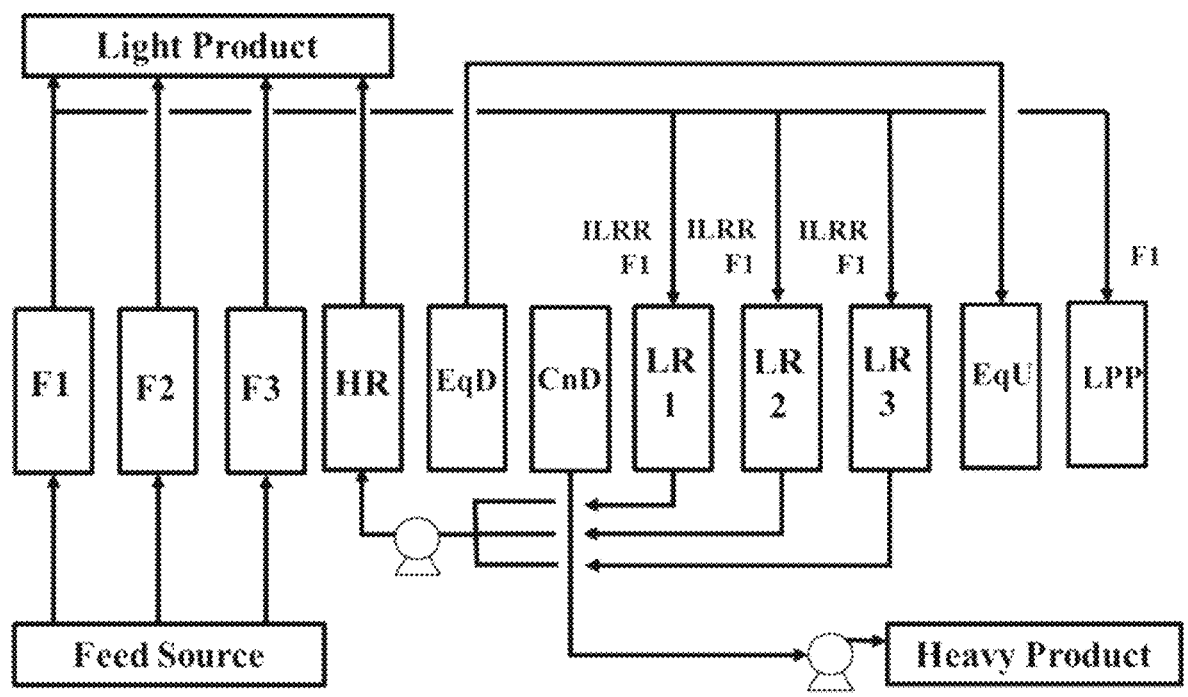
FIG. 4 shows one embodiment of an example VSA bed interconnect diagram of the current disclosure.

The figures herein are for illustrative purposes only and are not necessarily drawn to scale.

DETAILED DESCRIPTION OF A PREFERRED EMBODIMENT

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Extremely large gas flow rates, like that associated with flue gas produced from a 550 MW coal fired power plant, can exceed 25,000,000 SLPM. Even larger flue gas flow rates can be produced from steel mills and 1,000 and 1,500 MW power plants are not uncommon. The flue gas produced from these processes is at a pressure slightly above about 100 kPa and a temperature between ambient and 125° C.

Pressure swing adsorption (PSA) is a technology used to separate some gas species from a mixture of gases under pressure according to the species' molecular characteristics and affinity for an adsorbent material. It operates at near-ambient temperatures or even elevated temperatures and differs significantly from cryogenic distillation techniques of gas separation. Specific adsorbent materials (e.g., zeolites, activated carbon, molecular sieves, etc.) are used as a trap, preferentially adsorbing the target gas species at high pressure. The process then swings to low pressure to desorb the adsorbed material.

Pressure swing adsorption processes utilize the fact that under high pressure, gases tend to be attracted to solid surfaces, or "adsorbed". The higher the pressure, the more gas is adsorbed. When the pressure is reduced, the gas is released, or desorbed. PSA processes can be used to separate gases in a mixture because different gases tend to be attracted to different solid surfaces more or less strongly. If a gas mixture such as air is passed under pressure through a vessel containing an adsorbent bed of zeolite that attracts nitrogen more strongly than oxygen, part or all of the nitrogen will stay in the bed, and the gas exiting the vessel will be richer in oxygen than the mixture entering. When the bed reaches the end of its capacity to adsorb nitrogen, it can be regenerated by reducing the pressure, thus releasing the adsorbed nitrogen. It is then ready for another cycle of producing oxygen-enriched air.

However, an issue arises with low pressure flue gas streams when fed to a PSA process. The issue is that the feed cannot be compressed very much because of the cost of compression. Hence, the feed must be compressed only slightly with a blower to about 120 kPa, thereby limiting the axial pressure drop along the bed to be less than about 20 kPa differential. Moreover, because the feed pressure is so low, to effectively regenerate the beds a vacuum must be applied, typically down to absolute pressures of around 5 kPa to 10 kPa. To make matters even worse, the regeneration steps, typically consisting of countercurrent depressurization (CnD) and light reflux (LR) steps, also have a limit on the magnitude of the axial pressure drop, for if it is too large, then the beds are not effectively regenerated because the light end of the bed never experiences the lowest vacuum pressure experienced by the heavy (or feed) end of the bed. Two unique PSA processes were invented that overcome these pressure drop issues, where one of them only meets the $CO_2$ purity and $CO_2$ recovery constraints in the heavy product while the other one additionally meets the limit on the $O_2$ concentration in the heavy product.

Hence, this disclosure solves the problem associated with excessive pressure drop in PSA (VSA) beds treating extremely large gas flow rates, like that associated with flue gas produced from a 550, 1,000 and 1,500 MW coal fired power plants, with the corresponding flue gas flow rates exceeding 25,000,000, 50,000,000 and 75,000,000 SLPM.

Vacuum Swing Adsorption Process Description

In the foregoing analysis, a vacuum swing adsorption (VSA) process that uses commercial 13× zeolite beads was designed to handle a very large, full-scale, water free, flow rate corresponding to the flue gas produced from a 550 MW coal fired power plant. The goal is to minimize the number of total beds required in the VSA process by operating one or more identical VSA units in parallel. Each of these VSA units contains a minimum number of identical beds.

The feed conditions and adsorbent properties for this full scale VSA system are shown in FIG. 1, and the desired process conditions and performance are given in FIG. 2. Note that three different adsorbent bead sizes were evaluated. The $v/v_{FI}$ corresponds to the ratio of the interstitial velocity to the fluidization velocity and it should be lower than the number shown to protect the mechanical integrity of the adsorbent.

FIG. 3 shows VSA Cycle Schedule I (expressed as a unit block). The VSA system consists of $n_F+n_{LR}+3$ beds and 7 steps, where $n_F$ is the number of beds used in the feed step and $n_{LR}$ is the number of beds used in the light reflux step. The entire cycle schedule consists of $n_F+n_{LR}+3$ unit blocks, each one of identical or substantially identical duration equal to $t_{UB}=t_1+t_2+t_3$. An example bed interconnect diagram is shown in FIG. 4, which shows where the influent and effluent gases come from in each of the beds. This particular Cycle Schedule I has 3 F beds and 3 LR beds; it could have more or less of each as shown in FIG. 3. The corresponding cycle step sequence is: F1-F2-F3-HR-EqD-CnD-LR1-LR2-LR3-EqU-LPP. Note that all the LR gas comes from bed F1, but it could come from one or more of the $n_F$ beds undergoing the F step. Note also that the duration of the LR step is equal or substantially equal to the duration of the F step.

The 7-step VSA cycle step sequence includes a feed (F) step at around 1 atm, a cocurrent heavy reflux (HR) step at around 1 atm that receives all the heavy product coming from all the light reflux (LR) steps, a cocurrent equalization down (EqD) step, a countercurrent depressurization (CnD) step down to 5 kPa of absolute pressure as the lowest pressure, a countercurrent LR step at 5 kPa receiving as feed a fraction of the light product produced during the F step, a countercurrent equalization up (EqU) step that receives all the gas leaving the EqD step, and a light product pressurization (LPP) step that receives light product produced during the F step to bring the pressure of the bed back to around 1 atm. These bed interconnections are shown in FIG. 4. The feed flow rate into the VSA unit corresponds to the total feed flow rate to be processed (i.e., the 25,156,286

SLPM in FIG. 1) divided by the number of VSA units required that are operating in parallel. During the F step, the feed is split equally or substantially equally into all $n_F$ beds assigned to the F step; and during the LR step, the recycled light product from the F steps is split equally or substantially equally into all $n_{LR}$ beds assigned to the LR step. The fraction of the light product leaving the F step used in the LR step is referred to as the light reflux ratio (LRR).

The reason this design is using multiple feed beds and especially multiple light reflux beds in Cycle Schedule I is due to axial pressure drop along the bed. Pressure drop increases with increasing velocity through the bed and with the length of the bed. Thus, it increases with increasing feed flow rate (i.e., smaller diameter beds), with increasing light reflux flow rate (again, smaller diameter beds) during these respective steps, and with increasing the length of the bed. Previous work by the inventors has shown that during the light reflux step, which occurs under vacuum, the pressure drop could be so great, depending on the length and diameter of the bed, that the top of the bed might reach only 10 to 15 kPa while the bottom of the bed reaches the target pressure of 5 kPa, due to pressure drop. This greatly hindered regeneration, i.e., removal of $CO_2$ from the bed and thus diminished the process performance. This is why the inventors previous 3-bed 7-step design required an unacceptable number of 3-bed units running in parallel. These beds were short and wide to reduce pressure drop and velocity, respectively. Each unit had only one bed receiving gas during the F step and only one bed receiving gas during the LR step. The details are provided later. This pressure drop effect on the $CO_2$ capture performance has been largely overlooked in the VSA literature.

It was surmised that it might be possible to significantly reduce the total number of beds and the number of units running in parallel by using multiple feed beds and multiple light reflux beds in essentially the same cycle step sequence. To prove this concept, a process intensification scaling formulation was developed to size the full scale beds according to certain restrictions on velocity and pressure drop when scaled up from bench scale experimental results that met the $CO_2$ capture performance criteria. This intensification scaling formulation is explained in detail below, followed by full-scale simulations of some of the more optimal designs and extensions thereof with the inventors' dynamic adsorption process simulator (DAPS). It must be noted that this process intensification scaling formulation does not guarantee the $CO_2$ capture performance will be met, it only approximately sizes the beds to meet the pressure drop and velocity limitations. Thus, the results only serve as a starting point for the DAPS full-scale simulations by providing an estimate of the size of the beds, the number of feed beds, the number of light reflux beds, and the number of these multi-bed VSA units operating in parallel.

Process Intensification Scaling Formulation: Preliminary VSA Unit Design

A preliminary full-scale bed size in a VSA unit was obtained in MS Excel initially by satisfying the bed pressure drop conditions for both the F and LR steps using Ergun's equation provided in eqs 1 and 2.

$$\Delta P/P_0(\text{Feed}) = \frac{L}{P_0}\left[150\frac{\mu(1-\varepsilon_b)^2}{D_p^2\varepsilon_b^3}v_F + 1.75\frac{\rho_F(1-\varepsilon_b)}{D_p\varepsilon_b^3}v_F^2\right] < 0.15 \quad (1)$$

$$\Delta P/P_0(LR) = \frac{L}{p_0}\left[150\frac{\mu(1-\varepsilon_b)^2}{D_p^2\varepsilon_b^3}v_{LR} + 1.75\frac{\rho_{LR}(1-\varepsilon_b)}{D_p\varepsilon_b^3}v_{LR}^2\right] < 0.02 \quad (2)$$

L is the bed length in m. Po is the pressure at the light product end of the bed and equal to 101.325 kPa. $\rho_F$ in kg/m$^3$ is the feed gas density at the feed end of the bed and approximately equal to $M_F P_F/RT$, with $P_F$ equal to 115 kPa. $M_F$ (=30.28 kg mole/kg) is the average molecular weight of the feed gas. $\rho_{LR}$ in kg/m$^3$ is the LR gas density at the feed end of the bed and approximately equal to $M_{LR}P_{LR}/RT$, with $P_{LR}$ equal to 7 kPa. $M_{LR}$ (=28 kg mole/kg) is assumed to be the molecular weight of $N_2$. $\mu$ is the gas viscosity in Pa s. $\varepsilon_b$ (=0.4158) is the bed porosity. $D_p$ (=0.003 m) is the adsorbent particle diameter. R is the universal gas constant and T is the temperature in K. $v_F$ and $v_{LR}$ are respectively the F and LR superficial velocities at the entrance of the bed in m/s. L, $v_F$ and $v_{LR}$ are approximated from $$L = \left(\frac{D_{BS}^2 L_{BS} F_T R_{LD}^2}{n_u F_{BS}}\right)^{\frac{1}{3}} \quad (3)$$

$$v_F = \frac{\frac{F_F}{(60)1000}\left(\frac{101.325}{115}\right)\left(\frac{343.15}{273.15}\right)}{\left(\frac{D}{2}\right)^2 \pi} = 2.35 \times 10^{-5}\frac{1}{n_u^{1/3}n_F}\left(\frac{F_{BS}R_{LD}}{D_{BS}^2 L_{BS}}\right)^{2/3}(F_T)^{1/3} \quad (4)$$

$$v_{LR} = \frac{\frac{F_F}{(60)1000}\left(\frac{101.325}{7}\right)\left(\frac{343.15}{273.15}\right)}{\left(\frac{D}{2}\right)^2 \pi} = 3.86 \times 10^{-4}\frac{LRR}{n_u^{1/3}n_{LR}}\left(\frac{F_{BS}R_{LD}}{D_{BS}^2 L_{BS}}\right)^{2/3}(F_T)^{1/3} \quad (5)$$

It is assumed that there are a total number of identical large scale VSA units equal to $n_u$ that are operating in parallel, where each contain $n_F$ beds for the F step and $n_{LR}$ beds for the LR step. Each of the beds in these units is also identical with length L and diameter D that is defined by a given aspect ratio $R_{LD}$ (i.e., $D=L/R_{LD}$).

Now, the large scale bed size is determined by scaling it up from a bench scale experimental system using eq 1-5. Eq 3-5 are derived by relating the large scale total flow rate $F_T$ (=25,156,286 SLPM) to the bench scale flow rate $F_{BS}$ (in this case=14 SLPM) in a 3-bed bench scale experimental PSA system with beds of length $L_{BS}$=0.508 m (20 inches) and diameter $D_{BS}$=0.0508 m (2 inches) with the performance meeting the $CO_2$ purity and $CO_2$ recovery constraints. It is also assumed that $$F_{LR} = (LRR)F_F\left(\frac{n_F}{n_{LR}}\right) \quad (6)$$

In eqs 1 to 5, LRR, $D_p$ and $R_{LD}$ are input parameters. $n_u$, $n_F$ and $n_{LR}$ are output parameters and determined so that eqs 1 and 2 are satisfied, while minimizing the amount of metal involved in all the beds. The total metal is proportional to the surface area of all the beds (S) and given by eq 7 with the restriction that $n_u$<20.

$$S=n_U(n_F+n_{LR}+3)(\pi DL+\pi D^2) \quad (7)$$

FIGS. 5, 6 and 7 show preliminary results for the lowest surface areas (S) for given values of $n_{LR}$ between 2 and 6, where the shaded results correspond to acceptable optimum designs. In FIG. 5, $R_{LD}$ is varied with $D_p$ fixed at 3 mm and LRR=0.03. In FIG. 6, $D_p$ is varied with $R_{LD}$=1.0 and LRR=0.03. In FIG. 7, LRR is varied with $D_p$ fixed at 3 mm and $R_{LD}$=1.0.

Note the marked effect of both $R_{LD}$ and $D_p$ on the total number of beds required for the VSA process. In FIG. 5, for example, in going from $R_{LD}$=1.0 down to 0.8, the process goes from requiring 108 beds [i.e., 12(3+3+3)] to only requiring 72 beds [i.e., 8(3+3+3)]. In FIG. 6, for example, in going from $D_p$=3.0 mm (commercially available) to $D_p$=9.0 mm (not commercially available but easy to make commercially), the process goes from requiring 12 units with 108 beds total [i.e., 12(3+3+3)] to requiring either 5 units with 30 beds total [i.e., 5(1+2+3)] or even 1 unit with 11 beds total [i.e., 1(3+5+3)]. Although these last two examples have quite large beds, the reduction in the number of units and number of beds per unit, and thus the corresponding number of valves and associated piping, is remarkable and just due to a larger diameter adsorbent bead. However, LRR has no effect on the total number of F beds required for the VSA process, but it does have an effect on the number of LR beds. In FIG. 7, for example, in going from LRR=0.03 to LRR=0.04, the process goes from requiring 12 units with 108 beds total [i.e., 12(3+3+3)] to requiring 19 units with 152 beds total [i.e., 19(3+2+3)].

Full Scale VSA Process Performance Predictions from the DAPS Using Cycle Schedule I The USC dynamic adsorption process simulator (DAPS) was used to carry out rigorous full-scale process simulations to predict the process performance of this VSA system. Based on the process intensification scaling results, initially five variations of VSA Cycle Schedule I were simulated. The VSA cycle schedules are shown in FIGS. 8A to 8E in terms of the unit block. For comparison, the original 3-bed cycle schedule is shown in FIG. 8F. The process intensification scaling analysis and DAPS simulations were also carried out with the cycle schedule as a baseline comparison.

The variations of Cycle Schedule I shown in FIGS. 8A, 8B and 8C, with the $D_p$=3 mm, utilize 3, 4 and 5 LR beds, respectively. Since they all have 3 feed beds, these three VSA cycle schedules differ only in the number of light reflux beds. The schedule shown in FIG. 8A is a 9-bed 7-step cycle schedule, with 3 beds always undergoing the F step, one bed undergoing the HR step, one bed undergoing the equalization down (EqD) step followed by the countercurrent depressurization (CnD) step in sequence, 3 beds always undergoing the LR step, one bed undergoing the equalization up (EqU) step followed by the light product pressurization (LPP) step in sequence. Note that only one F step and one LR step are counted in the total number of cycle steps, which makes it a 7-step cycle schedule. With this VSA unit having 9 beds, there are a total of 9 unit blocks in this VSA cycle schedule, where each of the 9 beds operates out of phase with each other while running the same set of 7 cycle steps in sequence. The cycle step sequence is: F1-F2-F3-HR-EqD-CnD-LR1-LR2-LR3-EqU-LPP. The total cycle time $t_C$ for this 9 bed VSA system is simply 9 times $t_{UB}$, or $t_C$=9$t_{UB}$. The cycle schedule shown in FIG. 8B is a 10-bed 7-step cycle schedule, with 4 beds undergoing the LR step with the rest of the cycle steps being the same as the previous cycle schedule. The cycle step sequence is: F1-F2-F3-HR-EqD-CnD-LR1-LR2-LR3-LR4-EqU-LPP. The total cycle time $t_C$ for this 10 bed VSA system is simply 10 times $t_{UB}$, or $t_C$=10$t_{UB}$. The cycle schedule shown in FIG. 8C is an 11-bed 7-step cycle schedule, with 5 beds undergoing the LR step with the rest of the steps being the same as the cycle schedule in FIG. 8C. The cycle step sequence is: F1-F2-F3-HR-EqD-CnD-LR1-LR2-LR3-LR4-LR5-EqU-LPP. The total cycle time $t_C$ for this 11 bed VSA system is simply 11 times $t_{UB}$, or $t_C$=11$t_{UB}$.

The cycle schedules shown in FIGS. 8D and 8E, now with $D_p$=9 mm, utilize 3 and 4 LR beds, respectively. Since they all have 3 feed beds, again these two VSA cycle schedules differ only in the number of light reflux beds. The cycle schedule shown in FIG. 8D is a 9-bed 7-step cycle schedule, with 3 beds always undergoing the F step, one bed undergoing the HR step, one bed undergoing the EqD step followed by the CnD step in sequence, 3 beds always undergoing the LR step, and one bed undergoing the EqU step followed by the LPP step. With this VSA unit having 9 beds, there are a total of 9 unit blocks in this VSA cycle schedule, where each of the 9 beds operates out of phase with each other while running the same set of 7 cycle steps in sequence. The cycle step sequence is: F1-F2-F3-HR-EqD-CnD-LM-LR2-LR3-EqU-LPP. The total cycle time $t_C$ for this 9 bed VSA system is simply 9 times $t_{UB}$, or $t_C$=9$t_{UB}$. The schedule shown in FIG. 8E is a 10-bed 7-step cycle schedule, with 4 beds undergoing the LR step with the rest of the cycle steps being the same as the cycle schedule shown in FIG. 8D. The cycle step sequence is: F1-F2-F3-HR-EqD-CnD-LR1-LR2-LR3-LR4-EqU-LPP. The total cycle time $t_C$ for this 10 bed VSA system is simply 10 times $t_{UB}$, or $t_C$=10$t_{UB}$.

The cycle schedule shown in FIG. 8F, with $D_p$=3 mm utilizes only 1 F bed and 1 LR bed. This cycle schedule is a 3-bed 7-step cycle schedule, with 1 bed always undergoing the F step, one bed undergoing the HR step followed by the EqD step and then the CnD step in sequence, and 1 bed undergoing the LR step followed by the EqU step and then followed by the LPP step in sequence. With this VSA unit having 3 beds, there are a total of 3 unit blocks in this VSA cycle schedule, where each of the 3 beds operates out of phase with each other while running the same set of 7 cycle steps in sequence. The cycle step sequence is: F-HR-EqD-CnD-LR-EqU-LPP. The total cycle time $t_C$ for this 3 bed VSA system is simply 3 times $t_{UB}$, or $t_C$=3$t_{UB}$.

Other simulation conditions are shown in FIG. 9. $t_1$ was fixed at 20 s, $t_2$ and $t_3$ were equal and varied from 40 to 110 s. Hence, the unit block time $t_{UB}$ varied from 100 to 240 s for all the cycle schedules. For $D_p$=3 mm, the total feed flow rate was separated evenly into 8 VSA units. DAPS only had to simulate one of these VSA units owing to the same performance in each one. The feed flow rate to each bed undergoing the F step in a VSA unit was 1,046,961.2 SLPM. For $D_p$=9 mm, the total feed flow rate was separated evenly into 2 VSA units. The feed flow rate to each bed undergoing the F step in a VSA unit was 4,187,844.9 SLPM. The LRR was varied from 0.02 to 0.04. The individual LRR (ILRR) was partitioned as follows:

$$ILRR = LRR \frac{n_F}{n_{LR}} \tag{8}$$

Using Cycle Schedule I, 39 simulations were carried out. They are summarized in FIG. 10. Runs 1-27 in FIG. 10 correspond to the 8 unit VSA process with $D_p$=3 mm and Runs 28-39 in FIG. 10 correspond to the 2 unit VSA process with $D_p$=9 mm.

Figure 11:
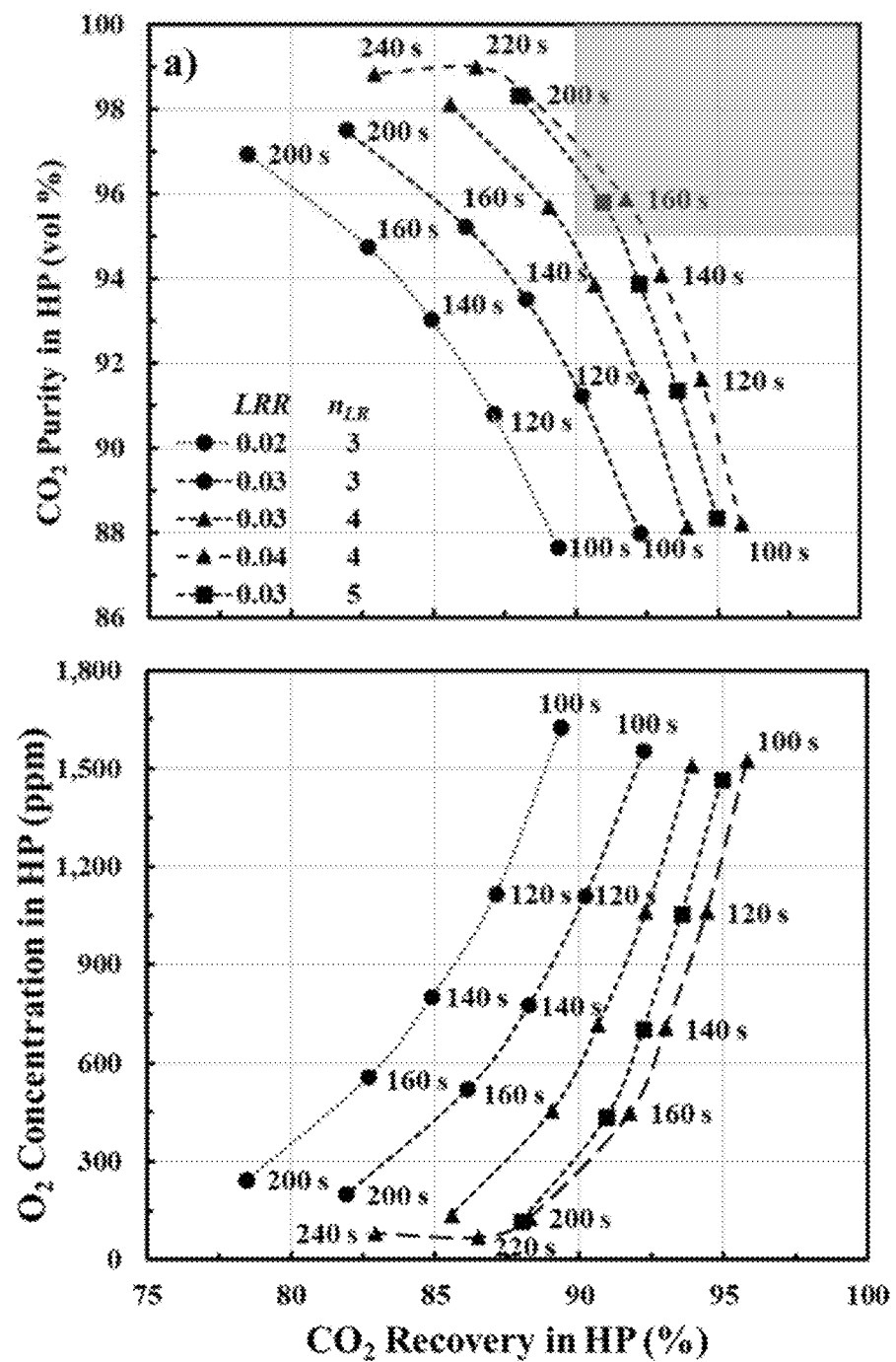
FIG. 11 shows effects of the LRR and $t_2$ and $t_3$ on the $CO_2$ purity and $O_2$ concentration in the heavy product against the $CO_2$ recovery.

Ten simulations of the 8-unit 9-bed 7-step (72 beds total) VSA process, twelve simulations of the 8-unit 10-bed 7-step (80 beds total) VSA process (now with 4 LR beds), and five simulations of the 8-unit 11-bed 7-step (88 beds total) VSA process (now with 5 LR beds) were carried out. These 10, 12 and 5 simulations correspond to Runs 1-10, 11-22 and 23-29 in FIG. 10. The effects of the LRR and $t_2$ and $t_3$ on the $CO_2$ purity and $O_2$ concentration in the heavy product against the $CO_2$ recovery in the heavy product are shown in FIG. 11. The shaded area in FIG. 11 represents the region of acceptable VSA process performance for $CO_2$ purity and $CO_2$ recovery (FIG. 2).

These results show it is indeed possible to achieve the specified VSA process performance with the 10-bed 7-step (80 beds total) VSA process for $t_{UB}$ between 150 and 180 s with the LRR=0.04 in terms of $CO_2$ purity and $CO_2$ recovery. Recall, the 3-bed 7-step large scale VSA unit that was scaled up from the bench scale and utilized the similar cycle schedule shown in FIG. 8F, which is similar to but subtlety different than Cycle Schedule I (FIGS. 8A-8E). As noted earlier, the cycle schedule in FIG. 8F uses only one F bed and only one LR bed, and the duration of the LR step is only 50% of the duration of the F step. Even while using the same process conditions as in FIGS. 1 and 2, because of these non-optimal features, this 3-bed 7-step VSA process required 5000 3-bed VSA units operating in parallel, an exorbitant and unacceptable number of total beds (i.e., 15,000), to meet the process performance specifications on the $CO_2$ purity and $CO_2$ recovery. The bed size was also quite short at L=D=0.819 m due to the pressure drop limitation during the regeneration steps and having only one LR bed; making them larger in diameter to reduce the number of total beds was not an option as the L/D should not be much less than unity. In addition, it could not achieve the limit on the $O_2$ concentration in the $CO_2$ heavy product, reducing it to only 314 ppm. These results show the number of total beds and number of VSA units operating in parallel can be reduced dramatically simply by using multiple feed and LR beds in Cycle Schedule 1 with the duration of the LR step equal, or substantially equal, to the duration of the F step. This was a non-obvious and non-intuitive modification to the cycle schedule in FIG. 8F that in one example reduced the 5000-unit 3-bed 7-step VSA system (15,000 total beds) to an 8-unit 10-bed 7-step VSA system (80 total beds) with reasonably sized beds (L=D=6.65 m), because 3 F beds and 4 LR beds were utilized simultaneously in Cycle Schedule I.

Figure 10:
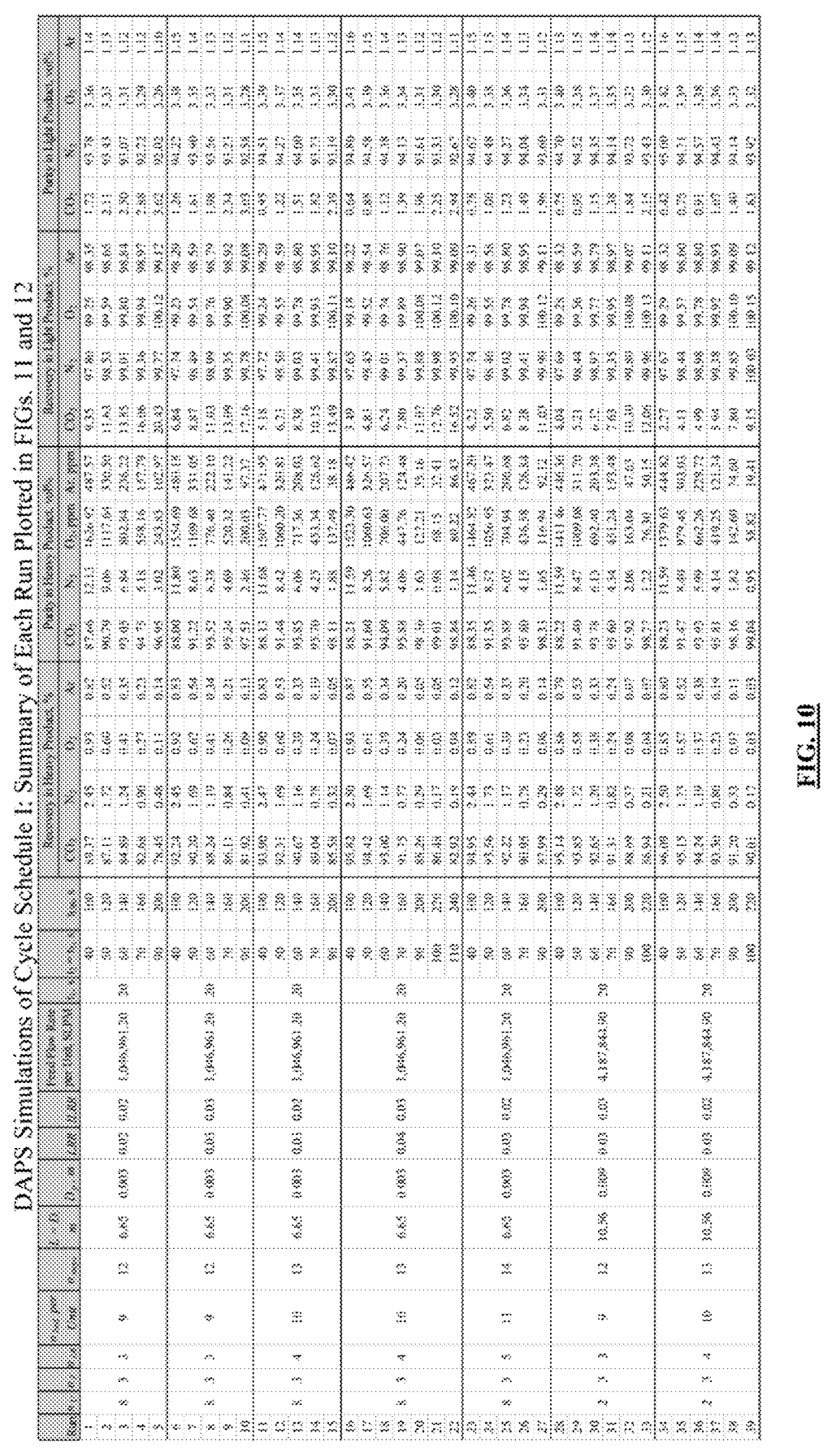

However, this VSA process utilizing Cycle Schedule I was unable to meet the performance criteria for the $O_2$ concentration (FIGS. 10 and 11). The corresponding $O_2$ concentration in the heavy product ranged between 1,630 and 59 ppm, far exceeding the 10 ppm limit (FIG. 2). One of the lowest $O_2$ concentrations in the heavy product was 68 ppm in the 10-bed 7-step VSA process for $t_{UB}$=220 s with LRR=0.04. Nevertheless, the 10 ppm limit on the $O_2$ concentration is indeed achievable through another non-obvious VSA cycle schedule change, as shown below when using Cycle Schedule II.

Figure 12:
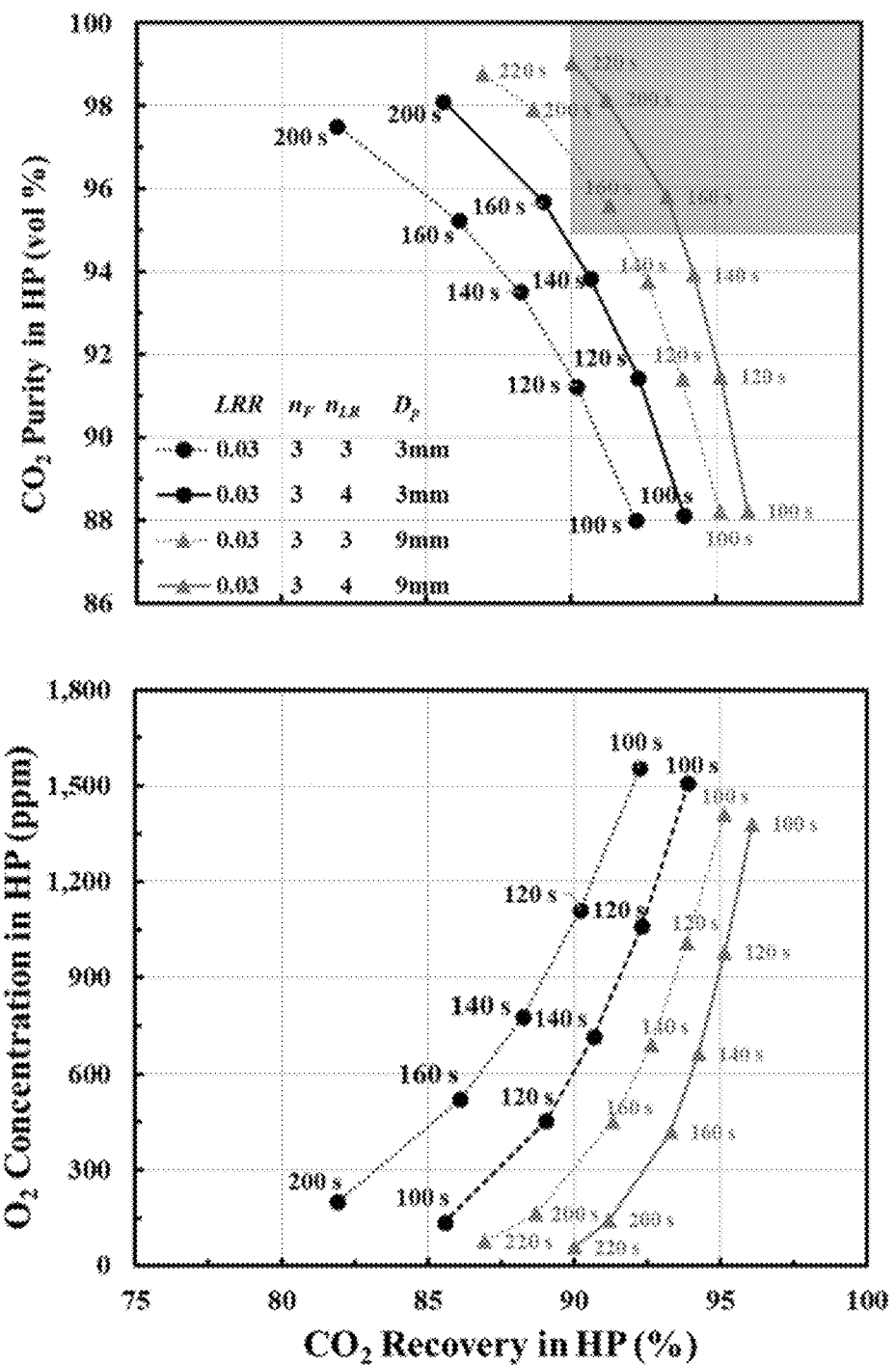
FIG. 12 shows the effects of $D_p$ and $n_{LR}$ on the $CO_2$ purity and $O_2$ concentration in the heavy product against the $CO_2$ recovery.

But first, the effect of increasing the adsorbent particle diameter is demonstrated with Cycle Schedule I. Six simulations of a 2-unit 9-bed 8-step VSA process (Runs 28-33 in FIG. 10) and six simulations of the 2-unit 10-bed 8-step VSA process (Runs 34-39 in FIG. 10) with $D_p$=9 mm were also carried out. These VSA processes are based on that shown in FIG. 6 with $D_p$=9 mm, but with each one increasing the number of LR beds from 2 to 3 and then from 3 to 4. The effects of $D_p$ and $n_{LR}$ on the $CO_2$ purity and $O_2$ concentration in the heavy product against the $CO_2$ recovery in the heavy product are shown in FIG. 12. With $D_p$=9 mm both the 2-unit 9-bed 7-step and the 2-unit 10-bed 7-step VSA processes met the performance criteria for $CO_2$ purity and $CO_2$ recovery using only 18 and 20 total beds, respectively. In fact, Run 39 with $t_{UB}$=220 s remarkably reduced the $O_2$ concentration in the heavy product down to 19.4 ppm (FIGS. 10 and 12). This excellent performance and decrease in the total number of required beds was due to the pressure drop through the bed being much less for the 9 mm bead compared to the 3 mm bead. For this reason the bed size could be much larger at L=D=10.56 m. Although these larger diameter adsorbent beads are not commercially available, it should be trivial for a manufacturer like UOP to make them.

This new VSA system design utilizing Cycle Schedule I is significantly better than the original VSA system design utilizing the limited 3-bed cycle schedule in FIG. 8F. Cycle Schedule I, with multiple F beds and multiple LR beds and with the duration of the LR step equal to, or substantially equal, the duration of the F step, has reduced the total number of beds from 15,000 to 80 using a commercial 3 mm diameter 13× beaded adsorbent or even 20 beds when using a potentially commercial 9 mm diameter 13× beaded adsorbent.

Full Scale VSA Process Performance Predictions from the DAPS Using Cycle Schedule II The dynamic adsorption process simulator (DAPS) was used to carry out 28 additional full scale simulations of this VSA system to determine if non-obvious modifications to Cycle Schedule I could provide the 10 ppm limit on the $O_2$ concentration in the $CO_2$ heavy product. Of the 39 runs disclosed in FIG. 10, Runs 23 to 27 are utilized in this section for comparison. Based on the previous results, two types of VSA cycle schedules were simulated. Cycle Schedule I has 8 identical VSA units, each operating $6+n_{LR}$ identical beds, where $n_{LR}$ was varied from 3 to 5. This VSA cycle schedule is shown in FIG. 13A in terms of the unit block. Cycle Schedule II also has 8 identical VSA units, each operating $7+n_{LR}$ identical beds with $n_{LR}$ varied from 4 to 6. Cycle Schedule II is shown in FIG. 13B. In both cycle schedules $D_p$ is 3 mm, i.e., the approximate size of commercial 13× beads.

Cycle Schedule I in FIG. 13A is a $6+n_{LR}$-bed 7-step cycle schedule, with 3 beds always undergoing the F step, one bed undergoing the HR step, one bed undergoing the EqD step followed by the CnD step in sequence, $n_{LR}$ beds always undergoing the LR step, and one bed undergoing the EqU step followed by the LPP step in sequence. For the runs using Cycle Schedule I, $n_{LR}$=5. Thus, with this VSA unit having $6+n_{LR}$ beds, i.e., 11 beds, there are a total of 11 unit blocks in this VSA cycle schedule, where each of the 11 beds operates out of phase with each other while running the same set of 7 cycle steps in sequence. The sequence is: F1-F2-F3-HR-EqD-CnD-LR1-LR2-LR3-LR4-LR5-EqU-LPP. The total cycle time $t_C$ for this 11 bed VSA system is simply 11 times $t_{UB}$, or $t_C=11 t_{UB}$.

Cycle Schedule II in FIG. 13B is a $7+n_{LR}$-bed 11-step cycle schedule, with 3 beds always undergoing the F step, one bed undergoing the HR step, one bed undergoing the EqD step followed by the partial equalization down (PEqD) step and then CnD step in sequence, $n_{LR}$ beds always undergoing the LR step (with $n_{LR}$=5 or 6), one bed undergoing an idle (I) step followed by the partial equalization up (PEqU) step followed by an I step, and one bed undergoing the EqU step followed by the LPP step. A bed-to-bed partial equalization step differs from a conventional bed-to-bed equalization step in that for the partial equalization step the beds do not completely equalize in pressure. During a partial equalization step gas is allowed to flow from the higher pressure bed (PEqD) to the lower pressure bed (PEqU) for a certain duration of time such that at the end of the step the higher pressure bed remains at a higher pressure than the lower pressure bed; hence, the beds only partially equalize and their pressures are not the same at the end of the step as they would be in a conventional equalization step. With this VSA unit having $7+n_{LR}$ beds, there are a total of $7+n_{LR}$ unit blocks in this VSA cycle schedule, where each of the $7+n_{LR}$ beds operates out of phase with each other while running the same set of 11 cycle steps in sequence. As an example, with $n_{LR}=5$, the sequence is: F1-F2-F3-HR-EqD-PEqD-CnD-LR1-LR2-LR3-LR4-LR5-I-PEqU-I-EqU-LPP. Again, only one F step and one LR step are counted in the total number of cycle steps, while each I step counts as a step. The total cycle time $t_C$ for this $7+n_{LR}$ bed VSA system is simply $7+n_{LR}$ times $t_{UB}$, or $t_C=(7+n_{LR})t_{UB}$.

Figure 15A:
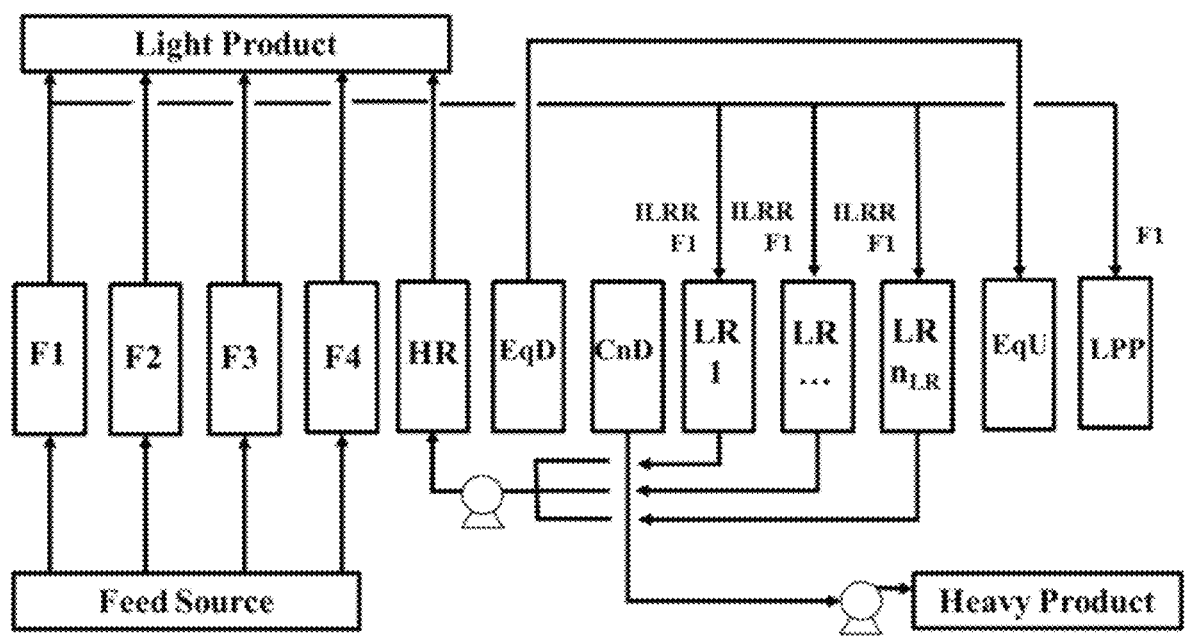
FIG. 15A shows one embodiment of a VSA bed interconnect diagram for Cycle Schedule I.
Figure 15B:
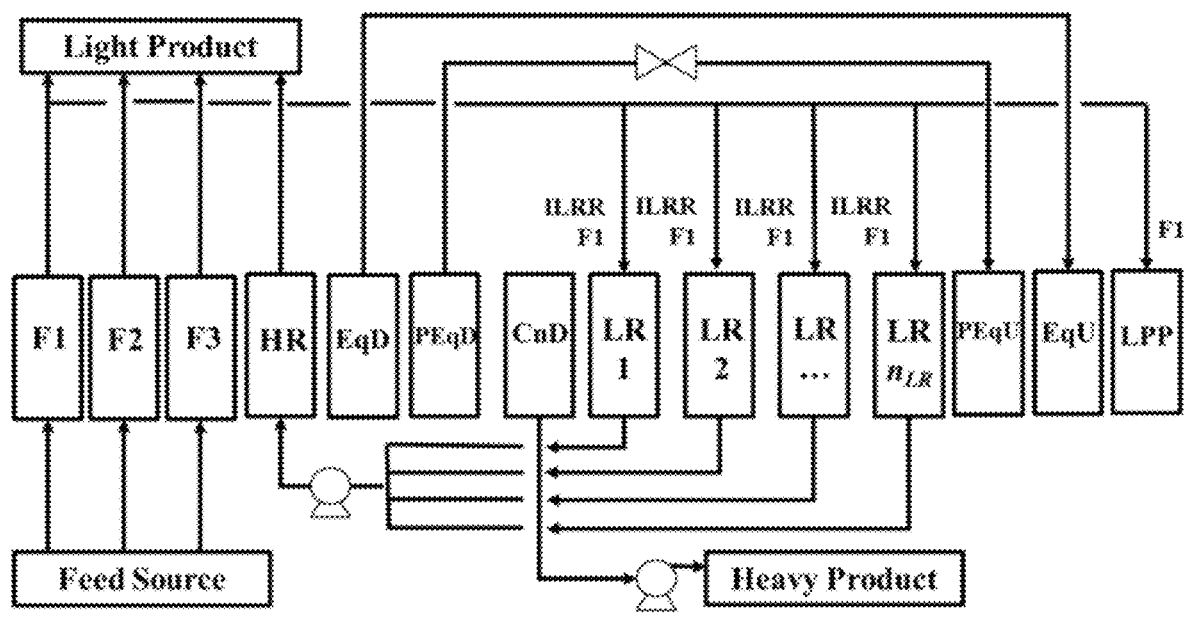
FIG. 15B shows one embodiment of a VSA bed interconnect diagram for Cycle Schedule II.

Other simulation conditions are shown in FIGS. 14A and 14B. For Cycle Schedule I (FIG. 14A), $t_1$ was fixed at 20 s, $t_2$ and $t_3$ were equal, or substantially equal, and varied from 40 to 110 s. Hence, the unit block time $t_{UB}$ varied from 100 to 240 s. For Cycle Schedule II (FIG. 14B), $t_1$ was equal, or substantially equal, to $t_2$ and fixed at 20 s, $t_3$ and $t_4$ were equal, or substantially equal, and varied from 30 to 100 s. Hence, the unit block time $t_{UB}$ varied from 100 to 240 s. For Cycle Schedules I and II, the total feed flow rate was separated evenly into 8 VSA units. DAPS only had to simulate one of these VSA units owing to the same performance in each one. The feed flow rate to each bed undergoing the F step in a VSA unit was 1,046,961.2 SLPM. The LRR was varied from 0.03 to 0.04. In this study, again, all the LR gas came from F1, but it could have come from any of the F beds undergoing the F step. The individual LRR (ILRR) was partitioned according to eq 8. The bed interconnect diagrams for these two cycle schedules are shown in FIGS. 15A and 15B. FIG. 15A is for Cycle Schedule I. FIG. 15B is for Cycle Schedule II, with the new partial equalization step. FIGS. 15A and 15B show the ILRR partitioning in detail, along with where the influent and effluent gases come from in each of the beds.

Figure 16A:
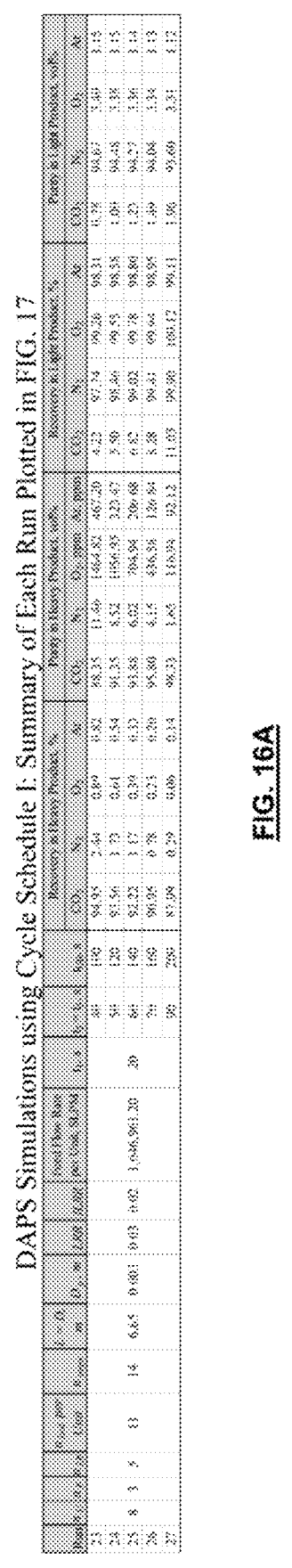
Figure 16B:
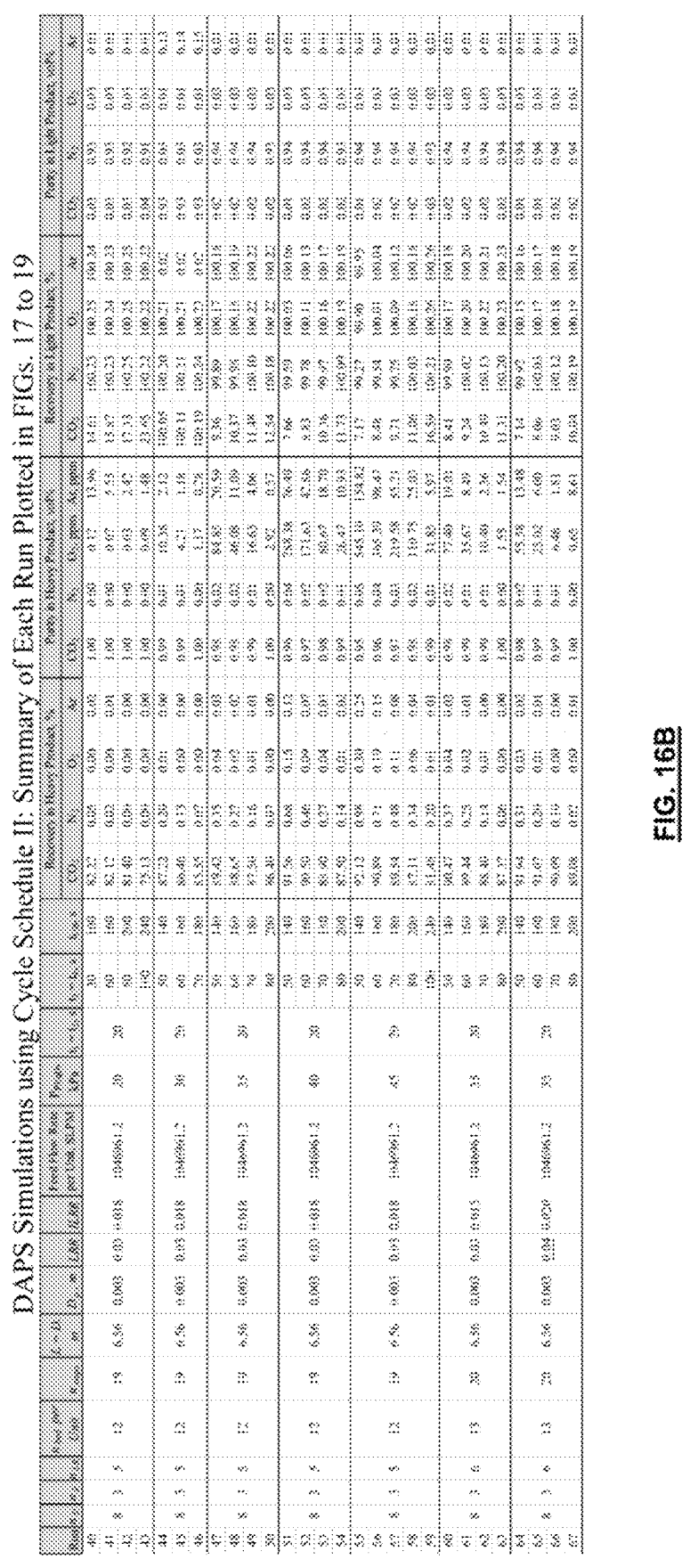

Five (5) previous runs with Cycle Schedule I and 28 new runs with Cycle Schedule II are respectively summarized in FIGS. 16A and 16B. They are numbered Runs 23-27 in FIG. 16A (same runs in FIG. 10) and Runs 40-67 in FIG. 16B. The VSA process conditions for Cycle Schedule I (Runs 23-27) and Cycle Schedule II (Runs 40-67) are provided in FIGS. 14A and 14B, respectively.

Figure 17:
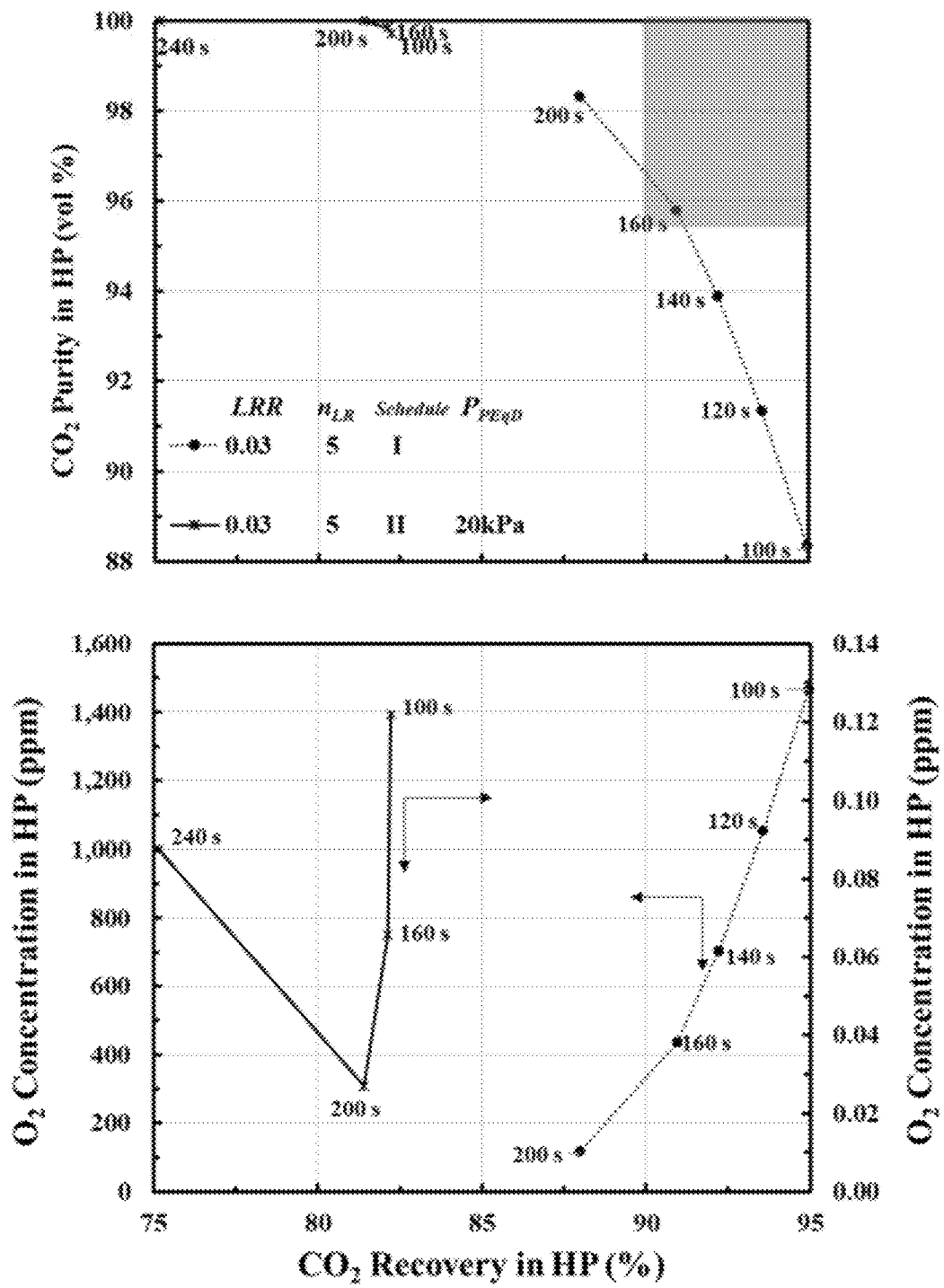
FIG. 17 shows a graph comparing 5 simulations of the 8-unit 11-bed 7-step VSA process using Cycle Schedule I to the four new simulations of an 8-unit 12-bed 12-step VSA process using Cycle Schedule II.

FIG. 17 compares these 5 simulations of the 8-unit 11-bed 7-step (88 beds total) VSA process using Cycle Schedule I (Runs 23-27 in FIG. 16A) to the four new simulations of an 8-unit 12-bed 11-step (96 beds in total) VSA process (with 5 LR beds) using Cycle Schedule II (Runs 40-43 in FIG. 16B). The purpose of this comparison was to determine if adding a partial equalization step to the cycle schedule would allow the 10 ppm $O_2$ concentration limit in the heavy product to be achieved. Recall, Cycle Schedule I only has one equalization step while Cycle Schedule II has 2 equalization steps, with the second one being a unique partial equalization step. Both cycle schedules have 5 LR steps with LRR=0.03. Indeed, this new Cycle Schedule II easily achieved the $O_2$ limit in the heavy product, as shown by the results for Runs 40-43 in FIG. 16B and FIG. 17. These runs also met the $CO_2$ purity requirement. In all 4 runs, the $CO_2$ purity was more than 99.8 vol % and the $O_2$ concentration was less than 1 ppm when $t_{UB}$ was varied from 100 s to 240 s. However, the $CO_2$ recovery was always less than 90% for these four runs using Cycle Schedule II. In contrast, some of the runs using Cycle Schedule I met the $CO_2$ purity and $CO_2$ recovery requirements, but never came close to meeting the $O_2$ limit in the heavy product. These results showed the new partial equalization step was important to meeting the $O_2$ limitation, although the $CO_2$ recovery had to be improved.

Figure 18:
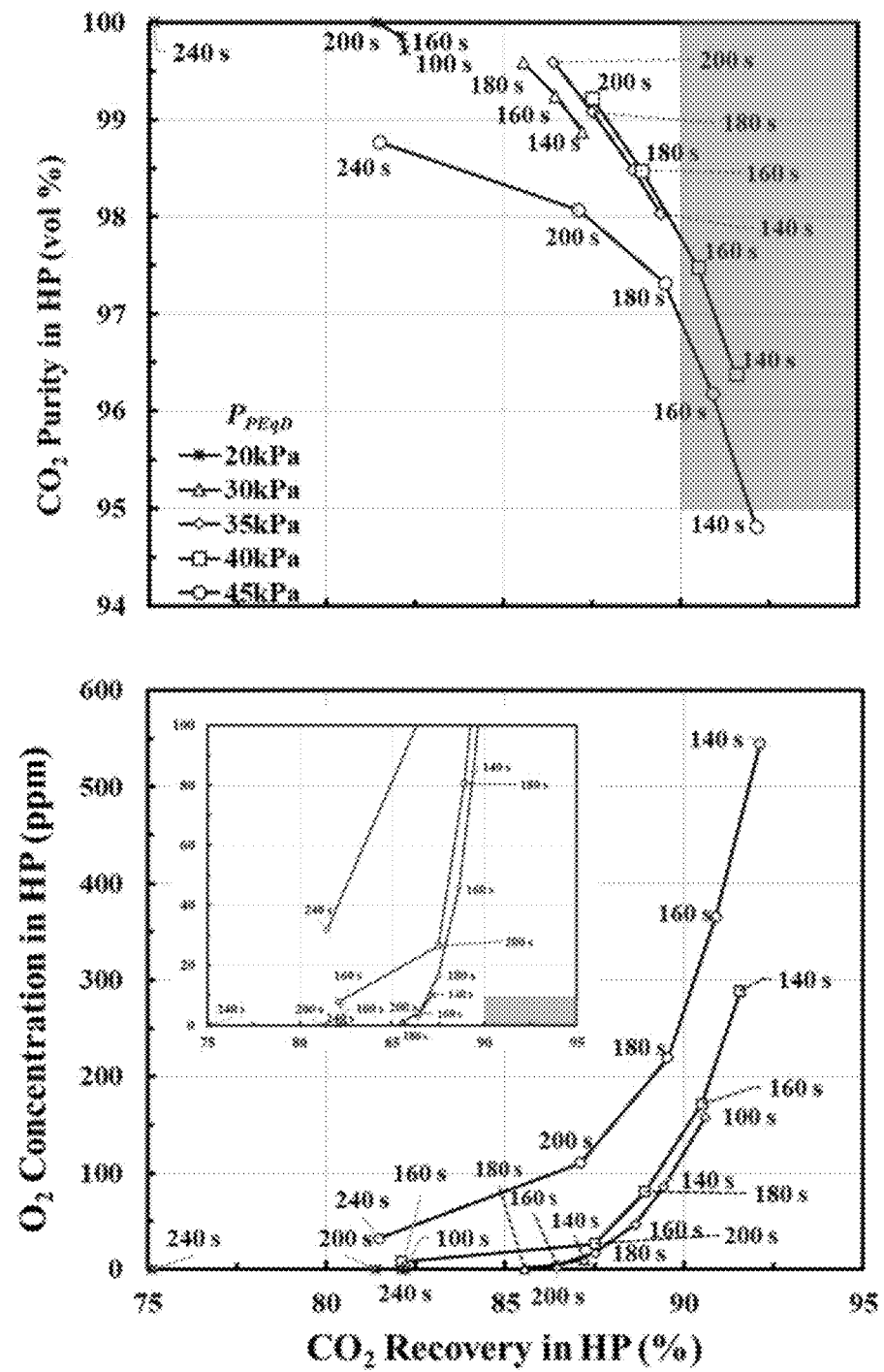
FIG. 18 shows a graph comparing the effect of the partial equalization pressure PEqD on the performance of a 12-bed 11-step VSA process using Cycle Schedule II.

FIG. 18 compares the effect of the partial equalization pressure PEqD on the performance of a 12-bed 11-step VSA process using Cycle Schedule II. The PEqD was 20 kPa (Runs 40-43), 30 kPa (Runs 44-46), 35 kPa (Run 47-50), 40 kPa (Runs 51-54) and 45 kPa (Runs 55-59), and for each the unit block time was varied from 100 to 240 s. The $CO_2$ recovery increased while the $CO_2$ purity decreased and the $O_2$ concentration increased as the PEqD increased from 20 to 40 kPa. When PEqD was 20, 30 or 35 kPa, the VSA process performance reached the desired $CO_2$ purity and $O_2$ concentration; however, although the $CO_2$ recovery also increased, it was still below 90%.

Figure 19:
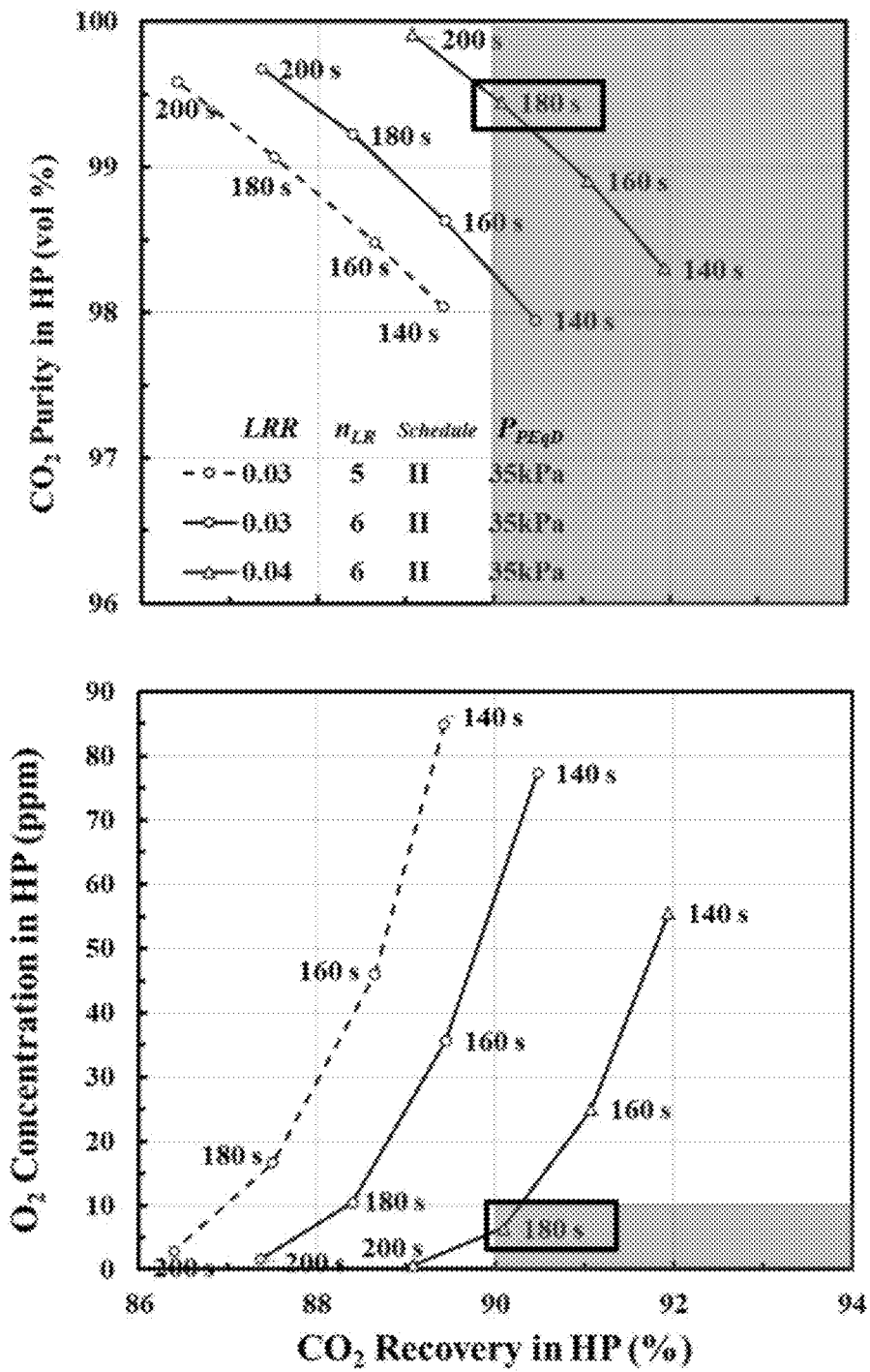
FIG. 19 shows a graph of LRR increased from 0.03 to 0.04 while still using $n_{LR}=6$.

In order to satisfy all three process performance requirements at the same time, it was necessary to add more $n_{LR}$ and increase the LRR. FIG. 19 shows the effect of increasing the $n_{LR}$ from 5 to 6 on the VSA process performance by comparing Runs 47-50 with $n_{LR}=5$ to Runs 60-63 with $n_{LR}=6$. These are respectively 12-bed 12-step and 13-bed 11-step VSA processes. While the $CO_2$ purity and $CO_2$ recovery were met for one case ($t_{UB}=140$ s), the $O_2$ purity limit was not met at 75 ppm.

To remedy this situation, the LRR was increased from 0.03 to 0.04 while still using $n_{LR}=6$. These results are also shown in FIG. 19. They correspond to Runs 60 to 63 and Runs 64 to 67. This was still a 13-bed 11-step (104 beds in total) VSA process. One of these four new runs achieved the desired process performance with reasonably sized beds i.e., Run 66. A step-by-step example of how this particular VSA process utilizing Cycle Schedule II would operate in practice is provided below.

Figure 21:
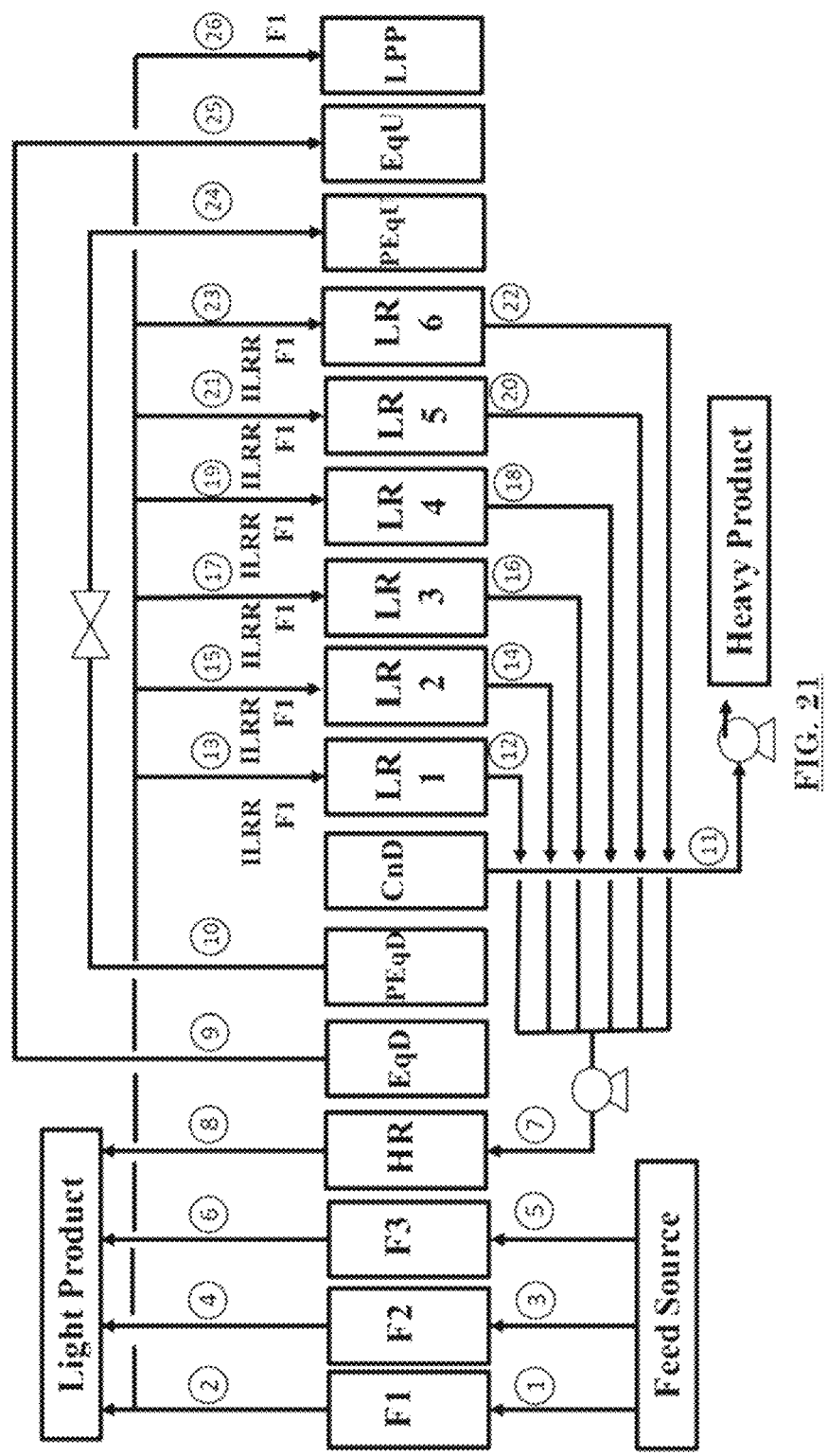
FIG. 21 shows one embodiment of a VSA bed interconnect diagram for Run 66 in FIG. 16B utilizing Cycle Schedule II.

Example: Run 66 in FIG. 16B represents an exemplary embodiment of this disclosure, wherein it meets all the process performance requirements listed in FIG. 2 when utilizing Cycle Schedule II in an 8-Unit 13-Bed 11-Step (104 total beds) VSA cycle shown in FIG. 20. The corresponding cycle step sequence is: F1-F2-F3-HR-EqD-PEqD-CnD-LR1-LR2-LR3-LR4-LR5-LR6-I-PEqU-I-EqU-LPP with $n_F=3$ and $n_{LR}=6$. Run 66 achieved a $CO_2$ purity of 99.4 vol %, a $CO_2$ recovery of 90.1% and $O_2$ concentration of 6.5 ppm in the $CO_2$ heavy product using reasonably sized beds of L=D=6.65, i.e., with $R_{LD}=1.0$ and an LRR=0.04, PEqD=35 kPa and $t_{UB}=180$ s. FIG. 21 shows the VSA bed interconnect diagram for Run 66 with stream numbers labeled for the average flow rate and average concentration of each component entering and exiting each bed during each step in the cycle schedule. The values of these average flow rates and average concentrations are provided in FIG. 22. Notice from the flow rates in FIG. 22 how three feed beds undergo a feed step (F) at a same time with a same feed flow rate and how six light reflux beds undergo a light reflux (LR) step at a same time with substantially a same light reflux flow rate, wherein the feed step and light reflux step durations are equal or substantially equal. Notice also how the system undergoes one equalization down step followed by a partial equalization down step with corresponding equalization up steps performed later in the cycle step sequence with idles step before, in between and after these equalization up steps, as shown in FIG. 20. These are exemplary embodiments of this disclosure.

This new VSA system design utilizing Cycle Schedule II is again significantly better than the original VSA system design utilizing the limited 3-bed cycle schedule in FIG. 8F. Cycle Schedule II, with multiple F beds, multiple LR beds, a second (but only partial) equalization step (a unique and non-obvious advance to the state-of-the-art) and with the duration of the LR step equal, or substantially equal, to the duration of the F step, has reduced the total number of beds from 15,000 to 104 using a commercial 3 mm diameter 13× beaded adsorbent, while meeting all three VSA process performance requirements, especially the 10 ppm limit on $O_2$ in the $CO_2$ heavy product.

Various modifications and variations of the described methods and systems of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A system for reducing excessive pressure drop in a pressure swing adsorption process comprising:
    a number of beds expressed as $n_F + n_{LR} - 3$ wherein at least one bed is a feed bed, $n_F$, and at least one bed is a light reflux bed, $n_{LR}$;
    a unit block cycle duration $t_{UB}$ expressed as $t_{UB} = t_1 + t_2 + t_3$, with the cycle duration $t_C$ expressed as $t_C = t_{UB}(n_F + n_{LR} + 3)$,
    wherein at least two feed beds undergo a feed step (F) at a same time with a same feed flow rate and at least two light reflux beds undergo a light reflux (LR) step at a same time with a same light reflux flow rate, wherein the feed step and light reflux step durations are substantially equal;
    wherein the system undergoes at least one equalization step;
    at least one cocurrent heavy reflux (HR) step receiving material from the light reflux step;
    at least one cocurrent equalization down (EqD) step;
    at least one countercurrent depressurization (CnD) step;
    at least one countercurrent LR step receiving a fraction of light product produced during the F step;
    at least one countercurrent equalization up (EqU) step that receives all gas leaving the EqD step; and
    at least one light product pressurization (LPP) step that receives light product produced during the F step;
    at least one idle (I) step followed by at least one partial equalization up (PEqU) step; and
    at least one partial equalization down (PEqD) step followed by at least one CnD step.

2. The system of claim 1, wherein pressure of the beds is returned to approximately 1 atm at the LPP step.

3. The system of claim 1 wherein a system sequence is F1-F2-F3-HR-EqD-PEqD-CnD-LR1-LR2-LR3-LR4-LR5-I-PEqU-I-EqU-LPP.

4. The system of claim 1, wherein each bed is identical in length L and diameter D as defined by a given aspect ratio $R_{LD}$ to provide $D = L/R_{LD}$.

5. The system of claim 1, wherein a 10 ppm limit on $O_2$ concentration is achieved when $CO_2$ is a component of a heavy product.

6. The system of claim 1, wherein adsorbent beads ranging from 3 mm to 9 mm in diameter are employed in beds of the system.

7. A method for reducing excessive pressure drop in a pressure swing adsorption process comprising:
    operating in parallel a number of beds expressed as nF+nLR+3 wherein at least one bed is a feed bed, $n_F$, and at least one bed is a light reflux bed, $n_{LR}$;
    arranging multiple feed beds to undergo a feed step (F) at a same time with a same feed flow rate;
    arranging multiple light reflux beds to undergo a light reflux (LR) step at a same time with a same light reflux flow rate;
    equalizing substantially duration of the feed step and light reflux step;
    undergoing at least one equalization step during the method;
    arranging at least one cocurrent heavy reflux (HR) step to receive material from the light reflux step;
    providing at least one cocurrent equalization down (EqD) step;
    providing at least one countercurrent depressurization (CnD) step;
    providing at least one countercurrent LR step receiving a fraction of light product produced during the F step;
    providing at least one countercurrent equalization up (EqU) step that receives all gas leaving the EqD step;
    providing at least one light product pressurization (LPP) step that receives light product produced during the F step;
    providing at least one idle (I) step followed by at least one partial equalization up (PEqU) step; and
    providing at least one partial equalization down (PEqD) step followed by at least one CnD step.

8. The method of claim 7, further comprising returning pressure of the beds to substantially 1 atm at the LPP step.

9. The method of claim 7 further comprising creating a method sequence of F1-F2-F3-HR-EqD-PEqD-CnD-LR1-LR2-LR3-LR4-LR5-I-PEqU-I-EqU-LPP.

10. The method of claim 7, further comprising forming each bed to be identical in length L and diameter D as defined by a given aspect ratio $R_{LD}$ to provide $D = L/R_{LD}$.

11. The method of claim 7, further comprising yielding a 10 ppm limit on $O_2$ concentration when $CO_2$ is a component of a heavy product.

* * * * *